(12) United States Patent
Tanaka et al.

(10) Patent No.: US 6,336,320 B1
(45) Date of Patent: Jan. 8, 2002

(54) EXHAUST GAS PURIFICATION DEVICE FOR AN INTERNAL COMBUSTION ENGINE

(75) Inventors: Hiroshi Tanaka; Toshio Tanahashi, both of Susono; Naoto Suzuki, Fujinomiya, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/345,406

(22) Filed: Jul. 1, 1999

(30) Foreign Application Priority Data

Jul. 10, 1998 (JP) .......................... 10-195638
Aug. 6, 1998 (JP) .......................... 10-223099

(51) Int. Cl.[7] .............................. F01N 3/00
(52) U.S. Cl. .......................... 60/285; 60/286; 60/277; 60/276; 123/443
(58) Field of Search .................. 60/277, 276, 285, 60/286; 123/443

(56) References Cited

U.S. PATENT DOCUMENTS

| | | | | |
|---|---|---|---|---|
| 4,134,261 A | * | 1/1979 | Iizuka et al. | 60/277 |
| 5,233,829 A | * | 8/1993 | Komatsu | 60/277 |
| 5,377,484 A | * | 1/1995 | Shimizu | 60/276 |
| 5,475,975 A | * | 12/1995 | Nasu | 60/276 |
| 5,715,679 A | * | 2/1998 | Asanuma et al. | 60/276 |
| 5,724,809 A | * | 3/1998 | Mitsutani et al. | 60/276 |
| 5,740,676 A | * | 4/1998 | Agustine et al. | 60/276 |
| 5,778,667 A | * | 7/1998 | Kinugasa et al. | 60/286 |
| 5,842,340 A | * | 12/1998 | Bush et al. | 60/274 |
| 5,848,528 A | * | 12/1998 | Liu | 60/274 |
| 5,970,707 A | * | 11/1999 | Sawada et al. | 60/277 |
| 5,974,793 A | * | 11/1999 | Kinugasa et al. | 60/285 |
| 6,014,859 A | * | 1/2000 | Yoshizaka et al. | 60/285 |
| 6,016,653 A | * | 1/2000 | Glassey et al. | 60/286 |
| 6,047,542 A | * | 4/2000 | Kinugasa et al. | 60/285 |
| 6,079,203 A | * | 7/2000 | Wakamoto | 60/286 |
| 6,109,024 A | * | 8/2000 | Kinugasa et al. | 60/286 |
| 6,173,571 B1 | * | 1/2001 | Kaneko et al. | 60/286 |

FOREIGN PATENT DOCUMENTS

| | | | | |
|---|---|---|---|---|
| JP | 04365920 A | * | 12/1992 | |
| JP | 410002219 A | * | 1/1998 | 60/276 |
| WO | WO 93/07363 | | 4/1993 | |

* cited by examiner

Primary Examiner—Thomas Denion
Assistant Examiner—Thai-Ba Trieu
(74) Attorney, Agent, or Firm—Oliff & Berridge PLC

(57) ABSTRACT

Start catalysts (SCs) having an $O_2$ storage function are disposed in an exhaust gas passage of an internal combustion engine, and an NOx occluding and reducing catalyst is disposed in the exhaust gas passages downstream of the SCs. NOx in the exhaust gas is absorbed by the NOx occluding and reducing catalyst when the engine is in operation at a lean air-fuel ratio. When NOx is to be released, the engine is operated at a rich air-fuel ratio so that exhaust gas having a rich air-fuel ratio flows into the SCs and into the NOx occluding and reducing catalyst. An electronic control unit (ECU) executes the secondary fuel injection that does not contribute to the combustion in the expansion stroke or in the exhaust stroke of each cylinder by using a direct cylinder fuel injection valve at the time when the engine operating air-fuel ratio is to be changed from a lean air-fuel ratio operation to a rich air-fuel ratio, so that exhaust gas having a rich air-fuel ratio flows into the SC and that oxygen stored in the SC is released. At the time of changing over the air-fuel ratio, therefore, the air-fuel ratio is changed from the lean side to the rich side without delay, eliminating such an occurrence that NOx is released from the NOx occluding and reducing catalyst without being purified at the time of changing the air-fuel ratio.

21 Claims, 12 Drawing Sheets

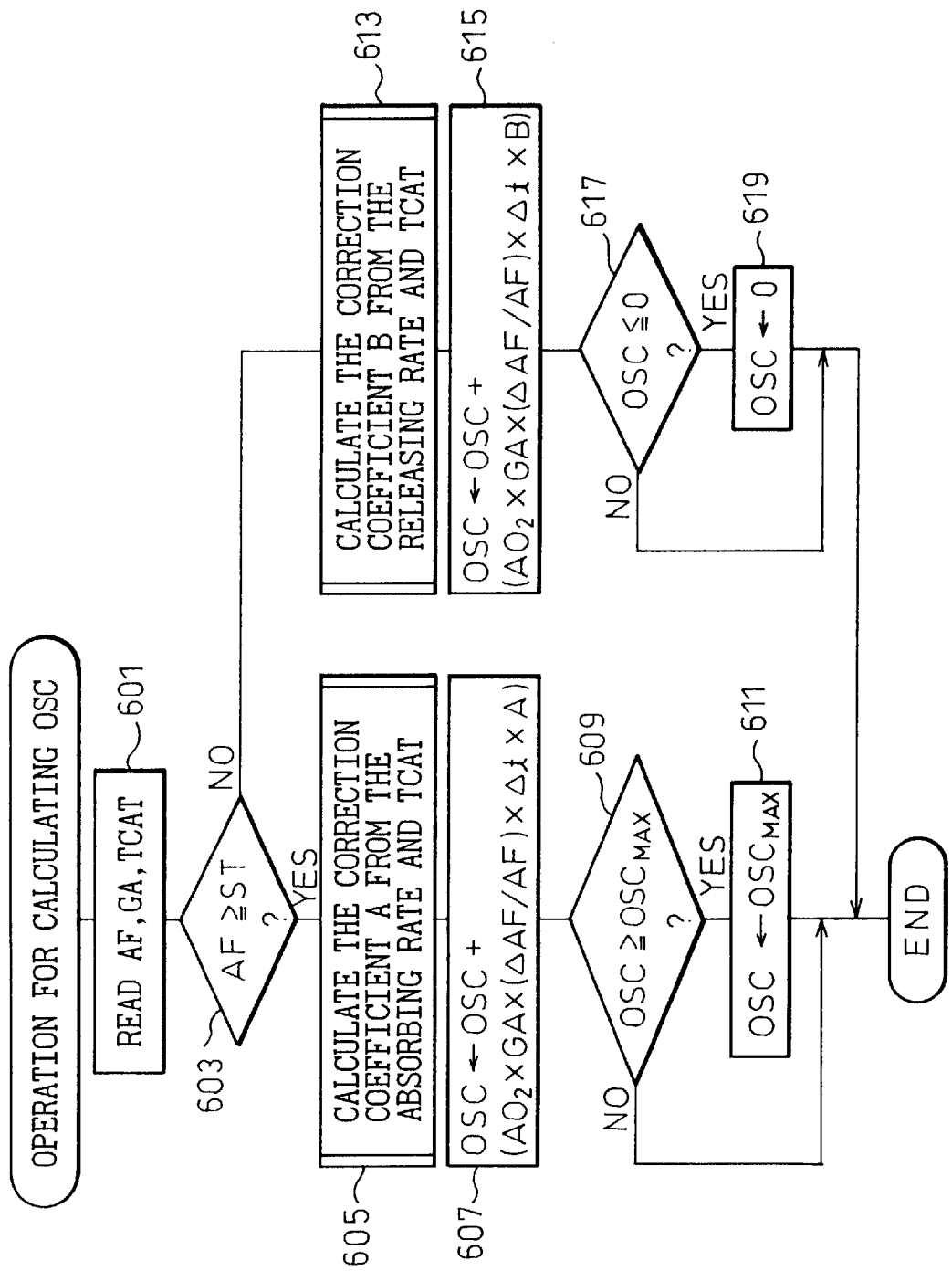

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the invention relates to an exhaust gas purification device for an internal combustion engine equipped with an exhaust gas purifying catalyst having an $O_2$ storage capability.

2. Description of the Related Art

There has been known a technology for purifying three components, i.e., HC, CO and NOx contained in the exhaust gas by disposing an exhaust gas purifying catalyst such as a three-way catalyst having an $O_2$ storage capability in an exhaust gas passage of an engine that is operated at nearly the stoichiometric air-fuel ratio. The $O_2$ storage capability of the three-way catalyst stands for a function for absorbing and holding the oxygen component in the exhaust gas in the catalyst when the air-fuel ratio of the exhaust gas flowing into the catalyst is lean, and for releasing the absorbed oxygen when the air-fuel ratio of the exhaust gas flowing in is rich. As is well known, the three-way catalyst is capable of simultaneously purifying three components, i.e., HC, CO and NOx contained in the exhaust gas when the air-fuel ratio of the exhaust gas flowing into the catalyst lies within a narrow range near the stoichiometric air-fuel ratio, but is no longer capable of simultaneously purifying the above-mentioned three components when the air-fuel ratio of the exhaust gas is deviated from the above-mentioned range. When the $O_2$ storage capability is added to the three-way catalyst, on the other hand, the three-way catalyst absorbs an excess of oxygen in the exhaust gas when the air-fuel ratio of the exhaust gas flowing in becomes more lean than the stoichiometric air-fuel ratio, and releases oxygen when the air-fuel ratio of the exhaust gas becomes rich, making it possible to maintain the atmosphere of the three-way catalyst at near the stoichiometric air-fuel ratio even when the air-fuel ratio of the exhaust gas flowing into the catalyst is deviated from the stoichiometric air-fuel ratio. Upon purifying the exhaust gas of the engine operated at an air-fuel ratio close to the stoichiometric air-fuel ratio by using the three-way catalyst having the $O_2$ storage capability, therefore, it becomes possible to favorably remove three components, i.e., HC, CO and NOx simultaneously.

There has further been known an NOx occluding and reducing catalyst which absorbs NOx (nitrogen oxides) in the exhaust gas when the air-fuel ratio of the exhaust gas flowing in is lean, and releases NOx which it has absorbed when the oxygen concentration in the exhaust gas flowing in becomes low.

An exhaust gas purification device using the NOx occluding and reducing catalyst has been disclosed in, for example, Japanese Patent No. 2600492. According to the exhaust gas purification device of this patent, the NOx occluding and reducing catalyst is disposed in the exhaust passage of the engine which operates at a lean air-fuel ratio so as to absorb NOx contained in the exhaust gas when the engine is operating at a lean air-fuel ratio, and to release NOx which it has absorbed when the amount of NOx absorbed by the NOx occluding and reducing catalyst has increased by executing a rich-spike operation in which the engine is operated at the stoichiometric air-fuel ratio or at a rich air-fuel ratio for a short period of time, in order to purify the released NOx by the reduction. That is, when the air-fuel ratio of the exhaust gas becomes the stoichiometric air-fuel ratio or the rich air-fuel ratio, the concentration of oxygen in the exhaust gas sharply decreases compared to that of the exhaust gas of a lean air-fuel ratio and the amounts of the unburned HC and CO components sharply increase in the exhaust gas. Therefore, when the engine operating air-fuel ratio is changed over to the stoichiometric air-fuel ratio or to the rich air-fuel ratio by the rich-spike operation, the air-fuel ratio of the exhaust gas flowing into the NOx occluding and reducing catalyst changes from the lean air-fuel ratio into the stoichiometric air-fuel ratio or the rich air-fuel ratio, and NOx are released from the NOx occluding and reducing catalyst due to a decrease in the oxygen concentration in the exhaust gas. As described above, further, the unburned HO and CO components are contained in relatively large amounts in the exhaust gas of the stoichiometric air-fuel ratio or the rich air-fuel ratio and, hence, NOx released from the NOx occluding and reducing catalyst are reduced upon reacting with the unburned HC and CO components in the exhaust gas.

Further, the exhaust gas purifying device disclosed in Japanese Patent No. 2600492 judges the amount of NOx occluded by the NOx occluding and reducing catalyst based on a value of an NOx counter which increases or decreases depending upon the operating conditions of the engine, and executes the rich-spike operation when the value of the NOx counter has reached a predetermined value, so that the NOx occluding and reducing catalyst will not be saturated with the NOx that are absorbed. The NOx counter of the above-mentioned patent estimates the occluded amount of NOx by increasing the value of the NOx counter at a predetermined interval by an amount of NOx absorbed by the catalyst in accordance with the operating conditions of the engine when the engine is operating at a lean air-fuel ratio, and by decreasing the value of the NOx counter at the predetermined interval by an amount of NOx released from the catalyst in accordance with the operating conditions of the engine when the engine is operating at a rich air-fuel ratio. That is, the amount of NOx emitted per a unit time from an engine that is operating at a lean air-fuel ratio is determined in accordance with the operating conditions of the engine (load on the engine, air-fuel ratio, flow rate of the exhaust gas, etc.), and the NOx occluding and reducing catalyst absorbs NOx of this amount per a unit time. Therefore, the amount of NOx occluded by the NOx occluding and reducing catalyst per unit time is proportional to the amount of NOx emitted from the engine per a unit time. According to the above-mentioned patent, the amount of NOx absorbed by the NOx occluding and reducing catalyst per a unit time during operating conditions of the engine is stored as an absorbed amount of NOx in advance, and the absorbed amount of NOx is calculated in accordance with the operating conditions of the engine at a predetermined interval when the engine is operating at a lean air-fuel ratio thereby to increase the value of the NOx counter. Similarly, furthermore, the amount of NOx released from the NOx occluding and reducing catalyst per a unit time when the engine is operating at a rich air-fuel ratio is determined in accordance with the operating conditions of the engine (air-fuel ratio, flow rate of the exhaust gas). According to the above-mentioned patent, therefore, the amount of NOx released from the NOx occluding and reducing catalyst per a unit time during the operating conditions of the engine is stored as a released amount of NOx, and the value of the NOx counter is decreased by the released amount of NOx at a predetermined interval when the engine is operated at a rich air-fuel ratio such as during the rich-spike operation.

According to the exhaust gas purification device disclosed in Japanese Patent No. 2600492, it is allowed to efficiently purify NOx when the engine is operating at a lean air-fuel ratio. However, a problem arises when a three-way catalyst having an $O_2$ storage capability is added as a start catalyst to the device of the above-mentioned Patent No. 2600492.

A principal object of the start catalyst is to remove HC and CO components released in large amounts from the engine during starting. The start catalyst must be disposed in an exhaust gas passage at a position as close as possible to the engine so that its temperature rises and reaches the activated temperature within a short period of time after the start of the engine. When added to the exhaust gas purification device of the Japanese Patent No. 2600492, therefore, the start catalyst is disposed in the exhaust gasw passage upstream of the NOx occluding and reducing catalyst.

When the catalyst having the $O_2$ storage capability is disposed as a start catalyst in the exhaust gas passage upstream of the NOx occluding an reducing catalyst, however, it has been found that NOx are released from the NOx occluding and reducing catalyst without being purified at the initial stage of the rich-spike operation when the rich-spike operation is executed in order to release NOx from the NOx occluding and reducing catalyst and to purify them by the reduction during the operation at a lean air-fuel ratio.

It is considered that this problem is caused by a delay in the change in the air-fuel ratio of the exhaust gas flowing into the NOx occluding and reducing catalyst from a lean air-fuel ratio to a rich air fuel ratio at the time of executing the rich-spike operation, due to the $O_2$ storage capability of the start catalyst.

That is, when the rich-spike operation is executed, the air-fuel ratio of the exhaust gas from the engine sharply changes from a lean air-fuel ratio to a rich air-fuel ratio. However, the start catalyst has the $O_2$ storage capability. Therefore, when the exhaust gas having a rich air-fuel ratio flows into the start catalyst, absorbed oxygen is released from the start catalyst, and the air-fuel ratio of the exhaust gas flowing out of the start catalyst is maintained near the stoichiometric air-fuel ratio. Accordingly, despite the rich-spike operation being started, the air-fuel ratio of the exhaust gas flowing into the NOx occluding and reducing catalyst fails to acquire a sufficiently rich value until oxygen absorbed by the start catalyst is all released. Therefore, the air-fuel ratio is often maintained close to the stoichiometric air-fuel ratio at the beginning of the rich-spike operation.

As the air-fuel ratio of the exhaust gas flowing into the NOx occluding and reducing catalyst changes from a lean air-fuel ratio over to a lean air-fuel ratio which is close to the stoichiometric air-fuel ratio, the oxygen concentration sharply decreases near the surface of the NOx occluding an reducing catalyst. As will be described later, the NOx occluding and reducing catalyst is holding NOx therein in the form of nitric acid ions bonded to an alkaline earth element (e.g., Ba) and the like. When the oxygen concentration decreases near the catalyst surface, however, NOx held near the surface of the NOx occluding and reducing catalyst are released from the surface of the catalyst rapidly. In this case, when the exhaust gas flowing into the NOx occluding and reducing catalyst are maintained at a lean air-fuel ratio close to the stoichiometric air-fuel ratio, NOx that are released are not all reduced but flow toward the downstream side of the NOx occluding and reducing catalyst since HC and CO are not contained in the exhaust gas in amounts sufficient for reducing all the NOx that are released. Due to the $O_2$ storage capability of the start catalyst, therefore, the air-fuel ratio of the exhaust gas flowing into the NOx occluding and reducing catalyst reaches a rich air-fuel ratio in a delayed manner at the time when the rich-spike operation is executed, and unpurified NOx are released from the NOx occluding and reducing catalyst.

When oxygen absorbed by the start catalyst is all released as described above, the exhaust gas on the downstream side of the start catalyst acquires a rich air-fuel ratio the same as that on the upstream side of the start catalyst, and an exhaust gas having a sufficiently rich air-fuel ratio is supplied into the NOx occluding and reducing catalyst. Therefore, when a given period of time passes after the start of the rich-spike operation, NOx released from the NOx occluding and reducing catalyst are all purified on the catalyst, and no unpurified NOx flow out of the NOx occluding and reducing catalyst. If unpurified NOx flow out of the NOx occluding and reducing catalyst every time when the rich-spike operation is executed, however, there arises a problem in that the NOx purification efficiency of the system decreases as a whole.

Further, in an engine in which the engine operating air-fuel ratio is changed from a lean air-fuel ratio to the stoichiometric air-fuel ratio, or to a rich air-fuel ratio, depending upon the operating conditions of the engine, the air-fuel ratio of the exhaust gas from the engine can often be changed from the lean air-fuel ratio to the stoichiometric air-fuel ratio, or to a rich air-fuel ratio, without the rich-spike operation being performed. In this case, too, the air-fuel ratio of the exhaust gas flowing into the NOx occluding and reducing catalyst may be temporarily maintained at a lean air-fuel ratio near the stoichiometric air-fuel ratio at the time when the operation air-fuel ratio is changed due to the $O_2$ storage capability of the exhaust gas purifying catalyst. Then, unpurified NOx are released in the same way as described above, and deteriorated exhaust gas are emitted.

According to the exhaust gas purification device disclosed in the Japanese Patent No. 2600492, furthermore, the amount of NOx occluded by the NOx occluding and reducing catalyst is estimated by using the NOx counter to judge the timing for releasing NOx from the NOx occluding and reducing catalyst. When the three-way catalyst having the $O_2$ storage capability is added as a start catalyst to the device of the above-mentioned patent, however, another problem arises as described below in addition to the problem mentioned above.

That is, when the exhaust gas purifying catalyst having the $O_2$ storage capability is disposed in the exhaust gas passage on the upstream side of the NOx occluding and reducing catalyst, it was found that the value of the NOx counter often does not correctly correspond to the amount of NOx occluded by the NOx occluding and reducing catalyst, in addition to the above-mentioned problem.

This problem is attributed to a delay in the change in the air-fuel ratio of the exhaust gas on the outlet side of the exhaust purifying catalyst due to the $O_2$ storage capability when the air-fuel ratio of the exhaust gas flowing into the exhaust gas purifying catalyst has changed.

That is, in the device of the above-mentioned patent, the value of the NOx counter is increased when the engine is operated at a lean air-fuel ratio, and the value of the NOx counter is decreased when the engine air-fuel ratio is changed to the rich side. With the exhaust gas purifying catalyst having the $O_2$ capability being disposed on the upstream side of the NOx occluding and reducing catalyst, however, the air-fuel ratio of the exhaust gas passing through the exhaust gas purifying catalyst does not change to a rich air-fuel ratio until oxygen stored in the exhaust gas purifying catalyst is all released due to the $O_2$ storage capability even if the operating air-fuel ratio has been changed from the lean side to the rich side and despite the exhaust gas acquiring a rich air-fuel ratio. Therefore, the air-fuel ratio of the exhaust gas flowing into the NOx occluding and reducing catalyst on the downstream side of the exhaust gas purifying catalyst is maintained near the stoichiometric air-fuel ratio until all the oxygen is released from the exhaust gas purifying catalyst despite the operating air-fuel ratio being changed to a rich air-fuel ratio, and NOx are not released from the NOx occluding and reducing catalyst. Therefore, if the operation is executed to decrease the amount of NOx occluded by the NOx occluding and reducing catalyst from a moment when the operating air-fuel ratio is changed from the lean side to the rich side, as taught in the above-mentioned Japanese Patent No. 2400492, the value of the NOx counter becomes smaller than a true occluded amount of NOx. It is therefore so judged that the NOx are all released at a moment when the value of the NOx counter has decreased to a predetermined value ($\approx 0$) as a result of the rich-spike operation even if the true value of the occluded NOx does not decrease to the predetermined value. When the operation is resumed at a lean air-fuel ratio, therefore, absorption of NOx starts again from a state where NOx are still occluded by the NOx occluding and reducing catalyst. Further, when the value of the NOx counter is increased from this state, the NOx occluding and reducing catalyst will occlude NOx in amounts larger than a value of the NOx counter. When the start or end of the rich-spike operation is judged based on the value of the NOx counter, therefore, it may often happen that NOx are occluded by the NOx occluding and reducing catalyst by an amount greater than an expected amount, whereby the absorption efficiency of the NOx occluding and reducing catalyst decreases and the NOx occluding and reducing catalyst is saturated with NOx that are absorbed.

Moreover, a similar problem occurs when the engine operating air-fuel ratio changes from the rich side to the lean side. When the engine operating air-fuel ratio is shifted from the rich side to the lean side and the exhaust gas flowing into the exhaust gas purifying catalyst acquires a lean air-fuel ratio, the exhaust gas purifying catalyst absorbs oxygen in the exhaust gas due to the $O_2$ storage capability. Therefore, excess oxygen in the exhaust gas is absorbed by the exhaust gas purifying catalyst, and the exhaust gas flowing into the NOx occluding and reducing catalyst on the downstream side of the exhaust gas purifying catalyst fails to acquire a lean air-fuel ratio while the exhaust gas purifying catalyst is absorbing oxygen; i.e., the NOx occluding and reducing catalyst absorbs no NOx. As the exhaust gas purifying catalyst absorbs oxygen up to its maximum oxygen storage amount and becomes no longer capable of absorbing oxygen in the exhaust gas, the exhaust gas flowing into the NOx occluding and reducing catalyst on the downstream side of the exhaust gas purifying catalyst acquires a lean air-fuel ratio, and the NOx occluding and reducing catalyst starts absorbing NOx. When the value of the NOx counter is increased while the exhaust gas purifying catalyst is absorbing oxygen, however, the amount of NOx really occluded by the NOx occluding and reducing catalyst becomes smaller than the value of the NOx counter, and the amount of NOx really occluded and the value of the NOx counter do not agree with each other.

SUMMARY OF THE INVENTION

In view of the problems in the related art as set forth above, the object of the present invention is to eliminate a delay in the change of the air-fuel ratio of the exhaust gas on the downstream side of the exhaust gas purifying catalyst from a lean air-fuel ratio into the stoichiometric air-fuel ratio or to a rich air-fuel ratio when the exhaust gas purifying catalyst having an $O_2$ storage capability is disposed in an exhaust gas passage.

Another object of the present invention is to provide a means for correctly estimating the amount of NOx occluded by an NOx occluding and reducing catalyst in an exhaust gas purifying device in which the NOx occluding and reducing catalyst is disposed on the downstream side of the exhaust gas purifying catalyst having the $O_2$ storage capability.

The objects as set forth above are achieved by an exhaust gas purification device for an internal combustion engine for changing, as required, the operating air-fuel ratio into the operation at a lean air-fuel ratio and to the operation at the stoichiometric air-fuel ratio or at a rich air-fuel ratio, comprising:

an exhaust gas purifying catalyst having an $O_2$ storage capability disposed in an exhaust gas passage of the engine; and a storage decreasing means for decreasing the amount of oxygen stored in said exhaust gas purifying catalyst by feeding the fuel that does not contribute to the combustion in the engine so that the air-fuel ratio of the exhaust gas flowing into said exhaust gas purifying catalyst is more enriched than the engine operating air-fuel ratio at the time when the engine is to be changed from the operation at a lean air-fuel ratio to the operation at the stoichiometric air-fuel ratio or at a rich air-fuel ratio.

According to this aspect of the invention, the fuel that does not contribute to the combustion is fed to the engine at the time when the engine operating air-fuel ratio is to be changed from a lean air-fuel ratio over to the stoichiometric air-fuel ratio or to a rich air-fuel ratio. Since the fuel does not contribute to the combustion, it does not burn and turns into an unburned HC component, and is emitted from the engine together with the exhaust gas. Therefore, the exhaust gas having an air-fuel ratio more rich than the engine operating air-fuel ratio and containing unburned HC in large amounts flows into the exhaust gas purifying catalyst. In this case, oxygen is released from the exhaust gas purifying catalyst due to the $O_2$ storage function of the exhaust gas purifying catalyst. However, there is a limit on the rate of releasing oxygen from the $O_2$ storage. If the exhaust gas that flows in contains unburned HC components in large amounts, the oxygen that is released is no longer sufficient for oxidizing all of the unburned HC components in the exhaust gas, and the air-fuel ratio of the exhaust gas on the downstream side of the exhaust gas purifying catalyst becomes more rich than the stoichiometric air-fuel ratio. That is, oxygen stored in the exhaust gas purifying catalyst is released and is readily consumed, whereby the air-fuel ratio of the exhaust gas on the downstream side of the exhaust gas purifying catalyst readily changes into a rich air-fuel ratio. This makes it possible to eliminate a delay in the change of the air-fuel ratio caused by the $O_2$ storage capability of the exhaust gas purifying catalyst. The supply of the fuel that does not contribute to the combustion is terminated when the amount of oxygen stored in the exhaust gas purifying catalyst is decreased to a sufficient degree (i.e., when the amount of oxygen is decreased to such a degree that oxygen released from the exhaust gas purifying catalyst does not practically cause problems) explained before. In an engine having a direct cylinder fuel injection valves which directly inject fuel into the cylinders, the storage decreasing means may inject the fuel into the cylinders in the expansion stroke or in the exhaust stroke of each cylinder. However, in an engine having exhaust port fuel injection valves that inject the fuel into the exhaust port of each cylinder, the storage decreasing means may inject the fuel into the exhaust ports. The fuel that does not contribute to the combustion may be fed by the $O_2$ storage decreasing means during the operation at a lean air-fuel ratio of just before the engine operating air-fuel ratio is changed or during the operation at the stoichiometric air-fuel ratio or at a rich air-fuel ratio immediately after the change.

According to another aspect of the present invention, there is provided an exhaust gas purification device for an internal combustion engine which executes the operation at a lean air-fuel ratio as required, comprising:

an exhaust gas purifying catalyst having an $O_2$ storage capability disposed in an exhaust gas passage of the engine;

a NOx occluding and reducing catalyst disposed in said exhaust gas passage downstream of said exhaust gas purifying catalyst to absorb NOx in the exhaust gas when the air-fuel ratio of the exhaust gas flowing in is a lean air-fuel ratio and to release the absorbed NOx when the air-fuel ratio of the exhaust gas flowing in becomes a rich air-fuel ratio;

a means for executing a rich-spike operation for changing the engine operating air-fuel ratio into a rich air-fuel ratio for a short period at the time when the absorbed NOx are to be released from said NOx occluding and reducing catalyst while the engine is operating at a lean air-fuel ratio; and a storage decreasing means for decreasing the amount of oxygen stored in said exhaust gas purifying catalyst by further enriching the air-fuel ratio of the exhaust gas flowing into said exhaust gas purifying catalyst beyond the air-fuel ratio of that during said rich-spike operation for a predetermined period of time immediately after the start of said rich-spike operation.

According to this aspect of the invention, the air-fuel ratio of the exhaust gas flowing into the exhaust gas purifying catalyst is further enriched beyond the air-fuel ratio of that during the rich-spike operation for a predetermined period immediately after the start of the rich-spike operation when the rich-spike operation is executed for releasing NOx from the NOx occluding and reducing catalyst. Therefore, unburned HC and CO components are contained in the exhaust gas in amounts sufficient for consuming all oxygen released even during the period in which oxygen is being released from the exhaust gas purifying catalyst due to the $O_2$ storage capability, and the air-fuel ratio of the exhaust gas becomes sufficiently rich on the downstream side of the exhaust gas purifying catalyst even during the period in which oxygen is being released from the exhaust gas purifying catalyst. Thus, the exhaust gas having a sufficiently rich air-fuel ratio are supplied into the NOx occluding and reducing catalyst on the downstream side of the exhaust gas purifying catalyst from the start of the rich-spike operation, and the unpurified NOx do not flow out of the NOx occluding and reducing catalyst. The air-fuel ratio of the exhaust gas flowing into the exhaust gas purifying catalyst immediately after the start of the rich-spike operation is so set as to contain the unburned HC and CO components in amounts sufficient for consuming all oxygen released from the exhaust gas purifying catalyst and for purifying all NOx released from the NOx occluding and reducing catalyst on the downstream side. The storage decreasing means may feed the fuel that does not contribute to the combustion to the engine, such as the one which injects the fuel into the cylinders during the expansion stroke or the exhaust stroke of the cylinder or the one which injects the fuel into the exhaust port, or may be the one which further enriches the engine operating air-fuel ratio beyond that during the subsequent rich-spike operation. The above-mentioned predetermined period of time is set to be a time sufficient for the absorbed oxygen to be all released from the exhaust gas purifying catalyst.

According to a further aspect of the invention, there is provided an exhaust gas purification device for an internal combustion engine which changes the operating air-fuel ratio from a lean air-fuel ratio to a stoichiometric air-fuel ratio or a rich air-fuel ratio as required, comprising:

an exhaust gas purifying catalyst having an $O_2$ storage capability disposed in an exhaust gas passage of the engine;

an NOx occluding and reducing catalyst disposed in said exhaust gas passage downstream of said exhaust gas purifying catalyst to absorb NOx in the exhaust gas when the air-fuel ratio of the exhaust gas flowing in is lean and to release the absorbed NOx when the oxygen concentration in the exhaust gas flowing in has decreased;

an NOx occlusion amount-estimating means for estimating the amount of NOx occluded by said NOx occluding and reducing catalyst based on the operating conditions of the engine; and an NOx occlusion amount correction means for correcting the occluded amount of NOx estimated by said NOx occlusion amount-estimating means based on the amount of oxygen stored in said exhaust gas purifying catalyst when said engine operating air-fuel ratio has changed.

According to this aspect of the invention, the NOx occlusion amount-estimating means estimates the amount of NOx occluded by the NOx occluding and reducing catalyst based on the operating conditions of the engine such as engine operating air-fuel ratio, flow rate of the exhaust gas, fuel injection, etc. The NOx occlusion amount correction means corrects the occluded amount of NOx that is estimated depending upon the amount of oxygen stored in the exhaust gas purifying catalyst. For example, when oxygen is stored in a large amount by the exhaust gas purifying catalyst, a change in the operating conditions of the engine (e.g., operating air-fuel ratio) appears as a change in the condition of the exhaust gas flowing into the NOx occluding and reducing catalyst in a delayed manner depending upon the amount of oxygen that is stored. Upon correcting the NOx occlusion amount depending upon the stored amount of oxygen (delay time from a change in the operating conditions of the engine), therefore, it becomes possible to correctly estimate the amount of NOx occluded by the NOx occluding and reducing catalyst based upon the operating conditions of the engine without affected by the $O_2$ storage capability of the exhaust gas purifying catalyst.

BRIEF DESCRIPTION OF THE DRAWINGS

The present invention will be better understood from the description as set forth hereinafter with reference to the accompanying drawings in which:

FIG. 6 is a flow chart illustrating the operation for estimating the amount of oxygen stored in the exhaust gas purifying catalyst used in the first to third embodiments;

DESCRIPTION OF THE PREFERRED EMBODIMENTS

Hereinafter, embodiments of the exhaust gas purification device according to the present invention will be explained with reference to the attached drawings.

Figure 1:
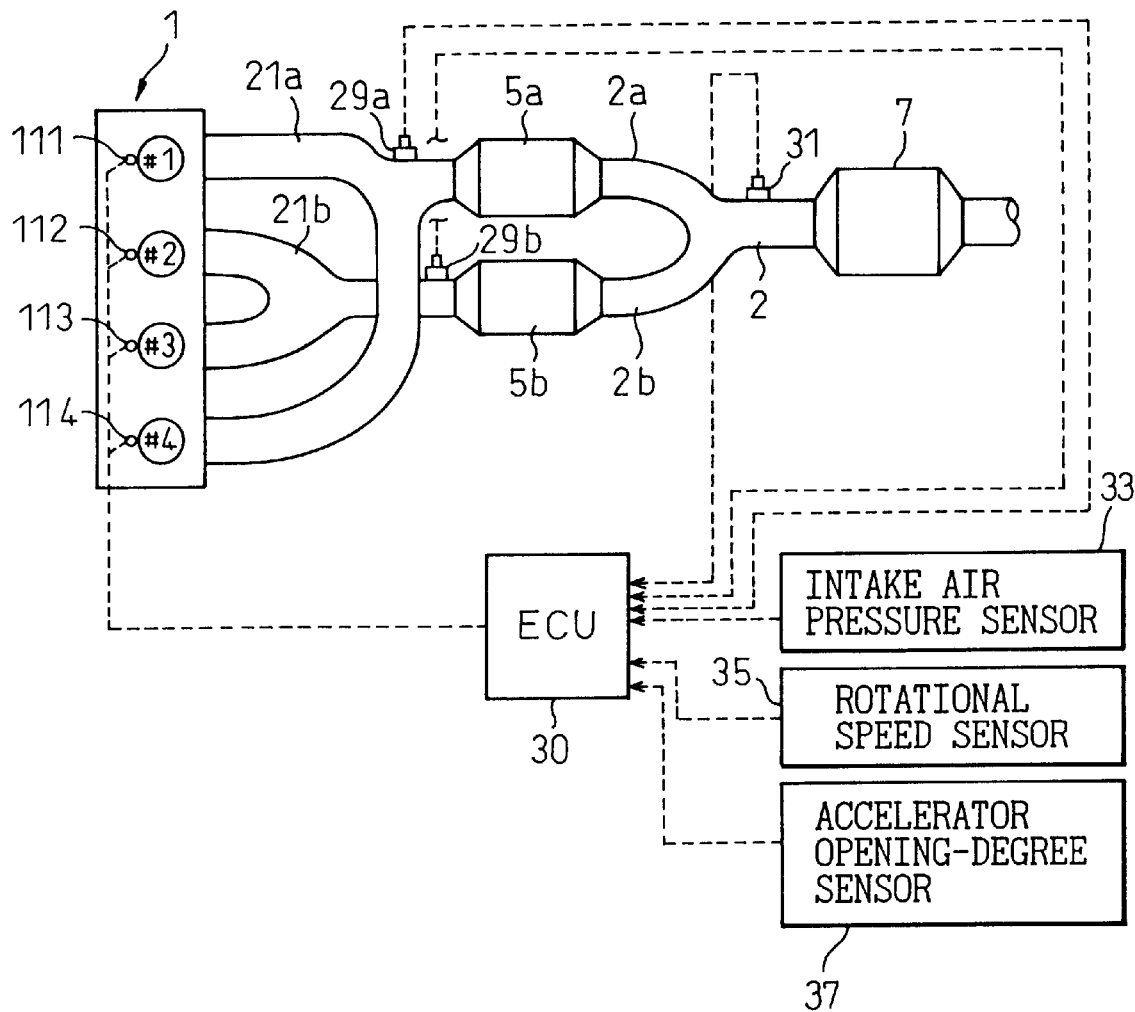
FIG. 1 is a view schematically illustrating the constitution of an embodiment in which the present invention is applied to an internal combustion engine for an automobile.

FIG. 1 is a view schematically illustrating the constitution of an embodiment in which the present invention is applied to an internal combustion engine for an automobile.

In FIG. 1, reference numeral 1 denotes an internal combustion engine for an automobile. In this embodiment, the engine 1 is a four-cylinder gasoline engine having four cylinders #1 to #4 which are equipped with fuel injection valves 111 to 114 for directly injecting fuel into the cylinders. As will be described later, the internal combustion engine 1 of this embodiment is a lean burn engine that can be operated at a lean air-fuel ratio which is larger than the stoichiometric air-fuel ratio.

In this embodiment, furthermore, the cylinders #1 to #4 are grouped into two groups of cylinders each including two cylinders so that the ignition timings will not take place consecutively (in the embodiment of FIG. 1, for example, the order of igniting the cylinders is 1-3-4-2, the cylinders #1 and #4 constituting one group of cylinders, and the cylinders #2 and #3 constituting another group of cylinders). The exhaust port of each cylinder is connected to an exhaust manifold of each group of cylinders, and is connected to an exhaust passage of each group of cylinders. In FIG. 1, reference numeral 21a denotes an exhaust manifold for connecting exhaust ports of the group of the cylinders #1 and #4 to an independent exhaust passage 2a, and reference numeral 21b denotes an exhaust manifold for connecting exhaust ports of the group of the cylinders #2 and #3 to an independent exhaust passage 2b. In this embodiment, start catalysts (hereinafter referred to as "SCs") 5a and 5b comprising a three-way catalyst are arranged on the independent exhaust passages 2a and 2b. The independent exhaust passages 2a and 2b meet together in a common exhaust passage 2 on the downstream side of the SC.

An NOx occluding and reducing catalyst 7 that will be described later is arranged in the common exhaust passage 2. In FIG. 1, reference numerals 29a and 29b denote air-fuel sensors arranged on the upstream side of the start catalysts 5a and 5b of the independent exhaust passages 2a and 2b, and reference numeral 31 denotes an air-fuel sensor arranged at an inlet port of the NOx occluding and reducing catalyst 7 in the exhaust passage 2. The air-fuel sensors 29a, 29b and 31 are so-called linear air-fuel sensors that produce voltage signals that change continuously in accordance with the air-fuel ratio of the exhaust gas over a wide range of air-fuel ratios.

In FIG. 1, furthermore, reference numeral 30 denotes an electronic control unit (ECU) of the engine 1. In this embodiment, the ECU 30 is a microcomputer of a known type having RAM, ROM and CPU, and executes basic control operations such as an ignition timing control and a fuel injection control of the engine 1. In this embodiment, the ECU 30 further executes the control operations to change the fuel injection mode of the direct cylinder fuel injection valves 111 to 114 and to change the engine operating air-fuel ratio depending upon the operating conditions of the engine as will be described later, in addition to the above-mentioned basic control operations. Furthermore, the ECU 30 estimates the amount of NOx occluded by the NOx occluding and reducing catalyst depending on the operating conditions of the engine by a method that will be described later, and executes a rich-spike operation to change the operating air-fuel ratio into a rich air-fuel ratio for a short period of time during the operation of the engine at a lean air-fuel ratio to release the absorbed NOx when the occluded amount of NOx that is estimated has increased up to a predetermined amount. The ECU 30 further executes the operation for decreasing the amount of oxygen stored in the SCs 5a and 5b at the time when the engine operating air-fuel ratio is changed from the lean side to the rich side or at the time of the rich-spike operation.

The input port of the ECU 30 receives signals from the air-fuel ratio sensors 29a and 29b representing the exhaust gas air-fuel ratios at the inlet of the start catalysts 5a and 5b, a signal from the air-fuel ratio sensor 31 representing an exhaust gas air-fuel ratio at the inlet of the NOx occluding and reducing catalyst 7, a signal corresponding to the intake air pressure of the engine from an intake-air-pressure sensor 33 provided in the intake manifold (not shown) of the engine, and a signal corresponding to the engine rotational speed from a rotational speed sensor 35 disposed near the crank shaft (not shown) of the engine. In this embodiment, furthermore, the input port of the ECU 30 receives a signal from an accelerator opening-degree sensor 37 disposed near an accelerator pedal (not shown) of the engine 1 representing an amount of the accelerator pedal depressed by a driver (degree of accelerator opening). The output port of the ECU 30 is connected, through a fuel injection circuit (not shown), to the fuel injection valves 111 to 114 of the cylinders to control the amount of fuel injected into the cylinders and the timings for fuel injection.

In this embodiment, the ECU 30 operates the engine 1 in the following five combustion modes depending upon the operating conditions of the engine:

①A lean air-fuel ratio stratified charge combustion (fuel is injected during the compression stroke).

②A lean air-fuel ratio uniform mixture/stratified charge combustion (fuel is injected twice, during the suction stroke and during the compression stroke).

③A lean air-fuel ratio uniform mixture combustion (fuel is injected during the suction stroke).

④ A stoichiometric air-fuel ratio uniform mixture combustion (fuel is injected during the suction stroke). ⑤ A rich air-fuel ratio uniform mixture combustion (fuel is injected during the suction stroke).

That is, the lean air-fuel ratio stratified charge combustion ① is carried out in the light-load operation region of the engine 1. In this state, the fuel is injected into the cylinders only one time in the latter half of the compression stroke in each cylinder, and the injected fuel forms a layer of a combustible mixture near the spark plug in the cylinder. In this operation state, furthermore, the fuel is injected in a very small amount, and the air-fuel ratio in the cylinder as a whole becomes from about 25 to about 30.

As the load increases from the above-mentioned state ① to enter into the low-load operation region, there takes place the above-mentioned lean air-fuel ratio uniform mixture/stratified charge combustion ②. The amount of fuel injected into the cylinder increases with an increase in the load exerted on the engine. In the above-mentioned stratified charge combustion ①, the fuel is injected in the latter half of the compression stroke, whereby the injection time is limited and limitation is imposed on the amount of fuel for forming the stratified charge. In this load region, therefore, the fuel is injected in advance in the former half of the suction stroke in an amount to compensate for the shortage of the fuel injected in the latter half of the compression stroke, thereby to supply the fuel in a target amount into the cylinder. The fuel injected into the cylinder in the former half of the suction stroke forms a very lean and uniform mixture before being ignited. In the latter half of the compression stroke, the fuel is further injected into this very lean and uniform mixture in order to form the charge of a combustible air-fuel ratio mixture near the spark plug. At the time of ignition, this combustible mixture charge starts burning, and the flame propagates to the surrounding lean mixture charge, so that the combustion takes place stably. In this state, the amount of fuel injected in the suction stroke and in the compression stroke is larger than that of the mode ①, but the air-fuel ratio as a whole is still lean (e.g., air-fuel ratio of about 20 to about 30).

When the load on the engine further increases, the engine uses the lean air-fuel ratio uniform mixture combustion ③. In this state, the fuel is injected only one time in the former half of the suction stroke, and the amount of the injected fuel becomes larger than that of the mode ②. The uniform mixture formed in the cylinder in this state assumes a lean air-fuel ratio (e.g., air-fuel ratio of from about 15 to about 25) relatively close to the stoichiometric air-fuel ratio.

As the load on the engine further increases to enter into the high-load operation region of the engine, the amount of fuel becomes larger than that of the mode ③, and the engine uses the stoichiometric air-fuel ratio uniform mixture operation ④. In this state, a uniform mixture of the stoichiometric air-fuel ratio is formed in the cylinder, and the engine output increases. When the load on the engine further increases to enter into the full-load operation of the engine, the amount of fuel injection is further increased in excess of that of the mode ④, and the engine uses the rich air-fuel ratio uniform mixture operation ⑤. In this state, the uniform mixture formed in the cylinder assumes a rich air-fuel ratio (e.g., air-fuel ratio of from about 12 to about 14).

In this embodiment, optimum operation modes ① to ⑤ have been empirically set in accordance with the degree of accelerator opening (amount of the accelerator pedal depressed by the driver) and the rotational speed of the engine, and a map for operation modes using the degree of accelerator opening and the engine rotational speed is stored in the ROM of the ECU 30. When the engine 1 is in operation, the ECU 30 determines which one of the above-mentioned operation modes ① to ⑤ is to be selected based on the degree of accelerator opening detected by the accelerator opening-degree sensor 37 and the rotational speed of the engine, and determines the amount of fuel injection, timing for fuel injection and the number of times of injection depending on each of the modes.

When any one of the modes ① to ③ (lean air-fuel ratio combustion) is selected, the ECU 30 determines the amount of fuel injection from the degree of accelerator opening and the rotational speed of the engine based on the numerical value tables that have been prepared in advance for the modes ① to ③. When a mode ④ or ⑤ (stoichiometric air-fuel ratio uniform mixture combustion or rich air-fuel ratio uniform mixture combustion) is selected, the ECU 30 sets the amount of fuel injection based on the intake air pressure detected by the intake-air-pressure sensor 33 and the rotational speed of the engine by using the numerical value tables that have been prepared for the modes ④ and ⑤.

When the mode ④ (stoichiometric air-fuel ratio uniform mixture combustion) is selected, the ECU 30 corrects the amount of fuel injection calculated as described above by a feedback control based on the outputs of the air-fuel sensors 29a and 29b, so that the air-fuel ratio in the exhaust gas of the engine becomes the stoichiometric air-fuel ratio.

In the engine 1 of this embodiment as described above, the amount of fuel injection increases with an increase in the load on the engine, and the operation mode changes depending upon the amount of fuel injection.

Next, described below are the start catalysts 5a, 5b and the NOx occluding and reducing catalyst according to this embodiment.

The start catalysts (SCs) 5a and 5b are constituted as three-way catalysts by using a honeycomb-type substrate of cordierite or the like, forming a thin coating of alumina on the surface of the substrate, and carrying a noble metal catalyst component such as platinum Pt, palladium Pd or rhodium Rh on the alumina layer. The three-way catalyst highly efficiently removes the three components, i.e., HC, CO and NOx near the stoichiometric air-fuel ratio. The three-way catalyst exhibits a decreased ability for reducing NOx when the air-fuel ratio of the exhaust gas flowing in becomes higher than the stoichiometric air ratio. When the engine 1 is operating at a lean air-fuel ratio, therefore, the three-way catalyst is not capable of removing NOx in the exhaust gas to a sufficient degree.

The start catalysts (SCs) 5a and 5b are disposed in the exhaust gas passages 2a and 2b at positions close to the engine 1 and have a relatively small capacity to decrease their heat capacity, so that they can be heated to their activated temperature within a short period of time after the start of the engine.

Next, described below is the $O_2$ storage capability of the start catalysts (SCs) 5a and 5b.

It has been known that an exhaust gas purifying catalyst, such as the three-way catalyst, that carries a metal component such as cerium (Ce) or the like, in addition to the catalyst components, exhibits an oxygen storage capability ($O_2$ storage capability). That is, cerium that is carried as an additive by the catalyst is bonded to oxygen in the exhaust gas and forms a ceria (cerium oxide) to store oxygen when the air-fuel ratio of the exhaust gas flowing into the catalyst is larger than the stoichiometric air-fuel ratio. When the air-fuel ratio of the exhaust gas flowing in is smaller than the stoichiometric air-fuel ratio, the ceria releases oxygen and returns to metal cerium. In the exhaust gas purifying catalyst having the $O_2$ storage capability, oxygen in the exhaust gas is absorbed by cerium even when the air-fuel ratio of the exhaust gas flowing into the catalyst is changed from a rich air-fuel ratio to a lean air-fuel ratio. Therefore, the oxygen concentration in the exhaust gas flowing into the catalyst decreases. When oxygen is being absorbed by cerium, therefore, the air-fuel ratio of the exhaust gas at the outlet port of the catalyst approaches the stoichiometric air-fuel ratio. When cerium carried by the catalyst is all bonded to oxygen (i.e., when the catalyst is saturated with oxygen) and becomes incapable of absorbing oxygen any more, the air-fuel ratio of the exhaust gas at the outlet port of the exhaust gas purifying catalyst changes into a lean air-fuel ratio which is the same as the air-fuel ratio of the exhaust gas at the inlet port of the catalyst. Similarly, furthermore, in a state where cerium has absorbed oxygen in a sufficiently large amount, oxygen is released from cerium when the air-fuel ratio of the exhaust gas flowing into the catalyst changes from a lean air-fuel ratio to a rich air-fuel ratio, whereby the oxygen concentration in the exhaust gas increases and the air-fuel ratio at the outlet port of the catalyst approaches the stoichiometric air-fuel ratio. In this case, too, after oxygen bonded to cerium is all released, oxygen is not released any more from the catalyst. Therefore, the air-fuel ratio of the exhaust gas at the outlet of the catalyst becomes a rich air-fuel ratio like the air-fuel ratio at the inlet of the catalyst. That is, when the exhaust gas purifying catalyst has the $O_2$ storage capability, the air-fuel ratio of the exhaust gas on the downstream side of the catalyst changes from the lean side to the rich side or from the rich side to the lean side later than that on the upstream side of the catalyst.

The SCs 5a and 5b of this embodiment has the $O_2$ storage capability. When the engine operating air-fuel ratio changes from the lean side to the rich side, therefore, the air-fuel ratio of the exhaust gas changes in a delayed manner on the downstream side of the SCs 5a and 5b, and the air-fuel ratio is temporarily maintained near the stoichiometric air-fuel ratio.

Next, described below is the NOx occluding and reducing catalyst 7 according to this embodiment. The NOx occluding and reducing catalyst 7 according to this embodiment uses alumina as a substrate to carry at least one component selected from the alkali metals such as potassium K, sodium Na, lithium Li and cesium Cs, alkaline earth elements such as barium Ba and calcium Ca, and rare earth elements such as lanthanum La, cerium Ce and yttrium Y, as well as a noble metal such as platinum Pt. The NOx occluding and reducing catalyst exhibits the action of absorbing and releasing NOx, i.e., absorbing NOx ($NO_2$, NO) in the exhaust gas in the form of nitric acid ions $NO_3^-$ when the air-fuel ratio of the exhaust gas flowing in is lean, and releases the absorbed NOx when the air-fuel ratio of the exhaust gas flowing in becomes rich.

The mechanism for absorbing and releasing NOx will be described next with reference to the case of using platinum Pt and barium Ba as an example. The same mechanism, however, is created even when there are used other noble metals, alkali metals, alkaline earth elements and rare earth elements.

When the concentration of oxygen increases in the exhaust gas that are flowing in (i.e., when the air-fuel ratio of the exhaust gas becomes a lean air-fuel ratio), oxygen adheres in the form of $O_2^-$ or $O^{2-}$ onto platinum Pt, whereby NOx in the exhaust gas react with $O_2^-$ or $O^{2-}$ on platinum Pt thereby to form $NO_2$. $NO_2$ in the exhaust gas and $NO_2$ thus formed are further oxidized on platinum Pt, absorbed by barium oxide BaO which acts an absorbing agent, bonded to BaO and diffused in the form of nitric acid ions $NO_3^-$ in the absorbing agent. In a lean atmosphere, therefore, NOx in the exhaust gas are absorbed in the form of nitrates by the NOx-absorbing agent.

When the concentration of oxygen greatly decreases in the exhaust gas that are flowing in (i.e., when the air-fuel ratio of the exhaust gas becomes the stoichiometric air-fuel ratio or a rich air-fuel ratio), $NO_2$ is formed in a decreased amount on platinum Pt, and the reaction proceeds in the reverse direction permitting nitric acid ions $NO_3^-$ in the absorbing agent to be released in the form of $NO_2$ from the absorbing agent. In this case, reducing components such as CO and the like as well as components such as HC, $CO_2$ and the like in the exhaust gas work to reduce $NO_2$ on the platinum Pt.

This embodiment uses an engine 1 capable of operating at a lean air-fuel ratio. When the engine 1 is operated at a lean air-fuel ratio, the NOx occluding and reducing catalyst absorbs NOx in the exhaust gas that flows in. When the engine 1 is operated at a rich air-fuel ratio, the NOx occluding and reducing catalyst 7 releases and purifies the absorbed NOx by the reduction. According to this embodiment, when the NOx are absorbed in increased amounts by the NOx occluding and reducing catalyst 7 during the operation at a lean air-fuel ratio, a rich-spike operation is carried out to change the air-fuel ratio of the engine from a lean air-fuel ratio to a rich air-fuel ratio for a short period of time in order to release NOx from the NOx occluding and reducing catalyst and to purify NOx by the reduction (regenerate the NOx occluding and reducing catalyst).

In this embodiment, the ECU 30 increases or decreases the value of an NOx counter in order to estimate the amount of NOx absorbed and held by the NOx occluding and reducing catalyst 7. The amount of NOx absorbed by the NOx occluding and reducing catalyst 7 per a unit time varies in proportion to the amount of NOx in the exhaust gas flowing into the NOx occluding and reducing catalyst per a unit time, i.e., varies in proportion to the amount of NOx generated by the engine 1 per a unit time. On the other hand, the amount of NOx generated by the engine per a unit time is determined by the amount of fuel fed to the engine, air-fuel ratio, flow rate of the exhaust gas, etc. When the operating conditions of the engine are determined, therefore, it is possible to know the amount of NOx absorbed by the NOx occluding and reducing catalyst. According to this embodiment, the engine operating conditions (degree of accelerator opening, engine rotational speed, amount of the air taken in, intake air pressure, air-fuel ratio, amount of feeding fuel, etc.) are changed in an experiment to measure the amount of NOx generated by the engine per unit time, and the amount of NOx absorbed by the NOx occluding and reducing catalyst 7 per a unit time is stored in the ROM of ECU 30 in the form of a numerical value table using, for example, load on the engine (amount of fuel injection) and the engine rotational speed as parameters. The ECU 30 calculates the amount of NOx absorbed by the NOx occluding and reducing catalyst per unit time at a predetermined interval (at every unit time) by using the load on the engine (amount of fuel injection) and the engine rotational speed, and increases the NOx counter by the amount of NOx absorbed. Therefore, the value of the NOx counter always indicates the amount of NOx absorbed by the NOx occluding and reducing catalyst 7. When the value of the NOx counter increases to more than a predetermined value while the engine is in operation at a lean air-fuel ratio, the ECU 30 executes the rich-spike operation to operate the engine in the above-mentioned mode ④ or ⑤ (stoichiometric air-fuel ratio uniform mixture combustion or rich air-fuel ratio uniform mixture combustion) for a short period of time (e.g., from about 0.5 to about 1 second). Therefore, NOx absorbed by the NOx occluding and reducing catalyst is released and are purified by the reduction. The time for maintaining the exhaust gas air-fuel ratio rich by the rich-spike operation is experimentally determined depending upon the kind and volume of the NOx occluding and reducing catalyst. The value of the NOx counter is reset to 0 after the NOx is released from the NOx occluding and reducing catalyst and are purified by the reduction upon the execution of the rich-spike operation. By performing the rich-spike operation in accordance with the amount of NOx absorbed by the NOx occluding and reducing catalyst 7 as described above, the NOx occluding and reducing catalyst 7 is properly regenerated and is not saturated with NOx which the NOx occluding and reducing catalyst has absorbed.

The method of calculating the occluded amount of NOx by using the NOx counter CNOX will be described later in detail.

In this embodiment as described above, the SCs 5a and 5b having the $O_2$ storage capability are provided in the exhaust gas passages on the upstream side of the NOx occluding and reducing catalyst 7 as described earlier. Therefore, despite the exhaust gas of a rich air-fuel ratio flow into the SCs 5a and 5b from the engine at the time when the rick-spike operation is executed, the exhaust gas of a lean air-fuel ratio close to the stoichiometric air-fuel ratio may flow into the NOx occluding and reducing catalyst 7 on the downstream side of the SCs 5a and 5b so far as oxygen is released from the SCs 5a and 5b, and unpurified NOx may be released from the NOx occluding and reducing catalyst 7 immediately after the start of the rich-spike operation. Similarly, when the engine operating air-fuel ratio is changed from a lean air-fuel ratio (above-mentioned operation modes ① to ③) to the stoichiometric air-fuel ratio or to a rich air-fuel ratio (above-mentioned operation mode ④ or ⑤) due to a change in the operating conditions of the engine 1, too, the unpurified NOx may be released from the NOx occluding and reducing catalyst 7 immediately after the air-fuel ratio is changed.

In the following embodiment, therefore, the air-fuel ratio of the exhaust gas flowing into the SCs 5a and 5b is enriched at the time of changing the engine air-fuel ratio from a lean air-fuel ratio into the stoichiometric air-fuel ratio or to a rich air-fuel ratio at the time of executing the rich-spike operation or changing the operation mode, in order to solve the above-mentioned problem caused by the $O_2$ storage capability of the SCs 5a and 5b.

Upon enriching the air-fuel ratio of the exhaust gas flowing into the SCs 5a and 5b, the exhaust gas containing HC and CO components in large amounts flow into the SCs 5a and 5b. Therefore, oxygen stored in the catalysts due to the $O_2$ storage capability is consumed by oxidizing the HC and CO components in the exhaust gas, and oxygen is all released from the catalyst in short periods of time. By setting the amounts of the HC and CO components to be larger than the amounts necessary for consuming all oxygen released from the catalyst, the exhaust gas maintain a rich air-fuel ratio on the downstream side of the SCs 5a and 5b all the time while oxygen is being released from the catalyst. This prevents the unpurified NOx from being emitted from the NOx occluding and reducing catalyst.

Various methods can be used for decreasing the stored amount of oxygen by enriching the air-fuel ratio of the exhaust gas flowing into the SCs 5a and 5b at the time of changing the engine air-fuel ratio. For example, (A) a method in which the fuel is injected into a cylinder from the direct cylinder fuel injection valve of each cylinder during the expansion stroke or the exhaust stroke (hereinafter referred to as "secondary fuel injection"), (B) a method in which the exhaust port of each cylinder is provided with an exhaust port fuel injection valve to inject the fuel into the exhaust port (hereinafter referred to as "exhaust port fuel injection"), or (C) a method in which the engine air-fuel ratio is temporarily enriched to a great degree at the time of changing the engine air-fuel ratio can be used. According to the above-mentioned methods (A) and (B), the fuel injected during the expansion or exhaust stroke of the cylinder, or injected to the exhaust port, is vaporized without being burned and forms HC and CO components in large amounts. That is, the fuel does not contribute to the combustion of the engine. Therefore, despite the fuel being fed in a relatively large amount, the output of the engine does not change. Since the fuel does not contribute to the combustion, on the other hand, oxygen remains in a relatively large amount in the exhaust gas when the engine is operated at a lean air-fuel ratio. That is, when the fuel that does not contribute to the combustion is fed to the engine, the air-fuel ratio of the exhaust gas as a whole is enriched, yet there exists unreacted oxygen as well as HC and CO components separately in the exhaust gas. Therefore, oxygen reacts with the HC and CO components on the SCs 5a and 5b, and the temperature of the SCs 5a and 5b may rise to an excessive degree depending upon the operating conditions.

According to the above-mentioned method (C), the combustion air-fuel ratio of the engine is temporarily enriched to a large degree, whereby there exists almost no unreacted oxygen in the exhaust gas, and the SCs 5a and 5b are not over-heated. Due to the combustion of large amounts of fuel, however, an increased torque is produced by the engine, resulting in a fluctuation in the output torque in some operating conditions of the engine.

It is therefore desired to select any one of the above-mentioned methods (A) to (C) in accordance with the characteristics of the engine and the operating conditions.

When the above-mentioned method (B)(exhaust port fuel injection) is employed, the effect will be nearly the same as when the above-mentioned method (A)(secondary fuel injection) is employed. Therefore, the following embodiment deals with the cases where the above-mentioned methods (A) and (C) are employed.

(1) First Embodiment

Figure 2:
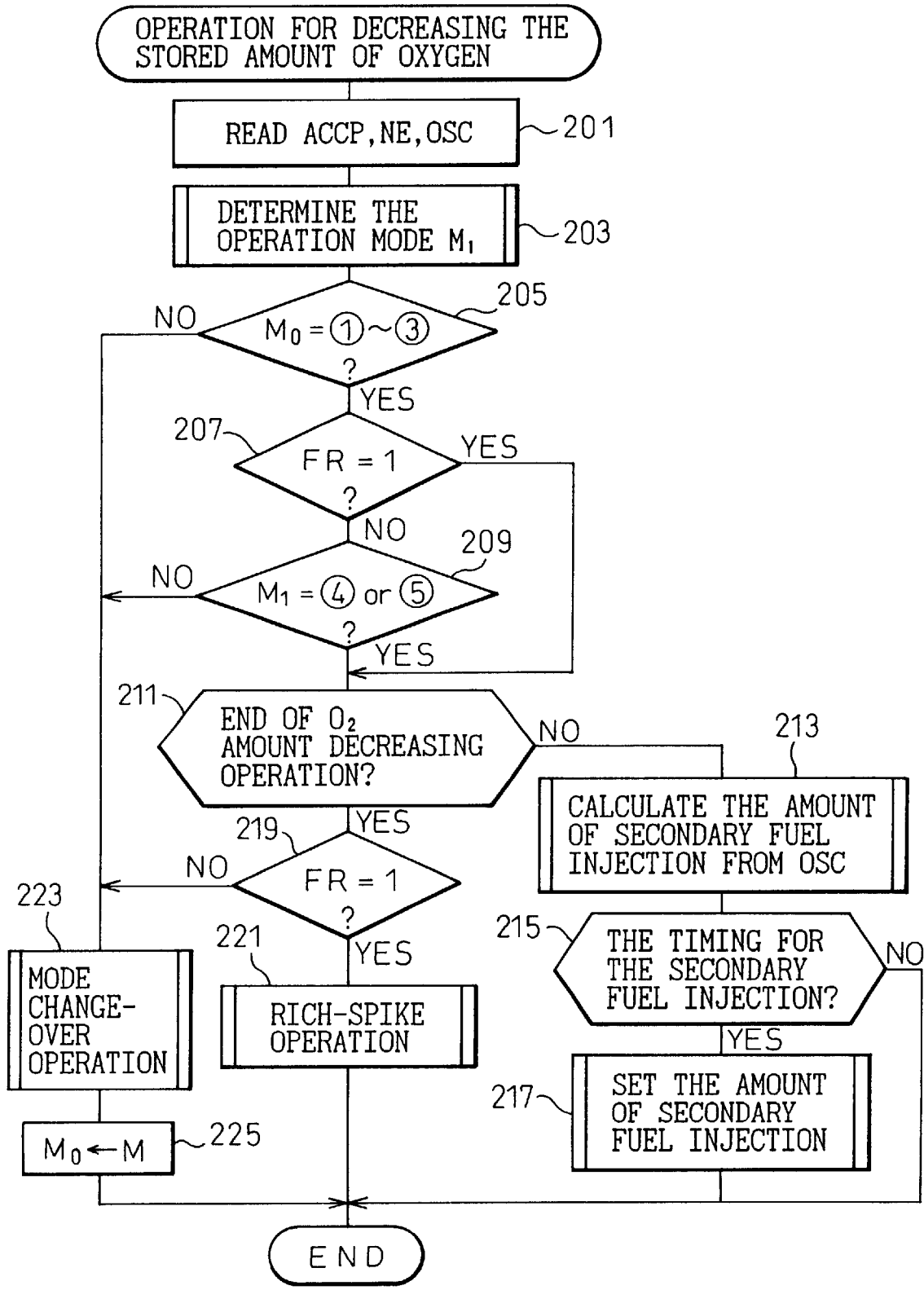
FIG. 2 is a flow chart illustrating the operation for decreasing the stored amount of oxygen according to a first embodiment of the present invention.

FIG. 2 is a flow chart illustrating the operation for decreasing the amount of oxygen stored in the SCs 5a and 5b according to a first embodiment of the present invention. This operation is executed by the ECU 30 at a predetermined interval (e.g., for every predetermined rotational angle of the crank shaft).

In the operation of FIG. 2, the amount of oxygen stored in the SCs 5a and 5b is decreased by injecting the fuel from the direct cylinder fuel injection valve in the expansion stroke or in the exhaust stroke of each cylinder just before changing over the engine operating air-fuel, when the operating air-fuel ratio is changed from a lean air-fuel ratio to the stoichiometric air-fuel ratio or to the rich air-fuel ratio operation, in accordance with a change in the operating conditions of the engine and when the rich-spike operation for releasing NOx from the catalyst 7 is performed. In other words, in this embodiment, the engine operating air-fuel ratio is changed after oxygen stored in SCs 5a and 5b due to $O_2$ storage capability is all released from the SCs 5a and 5b.

Thus, when the engine operating air-fuel ratio is being changed from the lean side to the rich side (or to the stoichiometric air-fuel ratio), no oxygen is released from the SCs 5a and 5b. Therefore, the air-fuel ratio of the exhaust gas flowing into the NOx occluding and reducing catalyst 7 immediately changes from a lean air-fuel ratio to a rich air-fuel ratio (or to the stoichiometric air-fuel ratio), and unpurified NOx are not released from the NOx occluding and reducing catalyst 7.

When the operation starts in FIG. 2, a degree of accelerator opening (amount of accelerator pedal depression by the driver) ACCP from the accelerator opening-degree sensor 37, a rotational speed NE of the engine calculated based on the output of the rotational speed sensor 35, and an amount of oxygen OSC stored in the SCs 5a and 5b, are read at a step 201. Calculation of the amount of oxygen OSC stored in the SCs 5a and 5b will be described later in detail.

Then, at a step 203, an optimum operation mode $M_1$ is selected out of the above-mentioned operation modes ① to ⑤ based on the degree of accelerator opening ACCP and the engine rotational speed NE. In this embodiment, the optimum operation modes for the degrees of accelerator opening and for the engine rotational speeds are stored in the ROM of the ECU 30 in the form of a numerical value table using the degrees of accelerator opening ACCO and the engine rotational speeds NE as parameters, and the ECU 30 selects an optimum operation mode out of ① to ⑤ from the numerical value table based on ACCP and NE that are read at the step 201. A value of $M_1$ (=① to ⑤) at the step 203 is representing an optimum operation mode as viewed from the present operating conditions of the engine (i.e., operation mode that serves as a target for the changing operation at a step 223, as explained later).

Then, at a step 205, it is judged whether the present operation mode $M_0$ is a lean air-fuel ratio operation (any one of the above-mentioned modes ① to ③), where $M_0$ is a parameter indicating one of the operation modes ① to ⑤ in which the engine is now operating ($M_0$=④ to ⑤). When the lean air-fuel ratio operation is not being carried out at the step 205, i.e., when the stoichiometric air-fuel ratio operation or a rich air-fuel ratio operation is now being carried out, the air-fuel ratio is not changed from the lean air-fuel ratio to the rich air-fuel ratio (or to the stoichiometric air-fuel ratio) irrespective of which one of the modes ① to ⑤ the target operation mode $M_1$ is now assuming. It is not probable that the unpurified NOx are released from the NOx occluding and reducing catalyst 7. Therefore, a step 223 is readily executed, and the operation mode of the engine is changed over to the target operation mode $M_1$ (when the operation is now being conducted at this target operation mode, then, this mode continues). At a step 225 after the operation mode has been changed over, the present operation mode $M_0$ is updated to a value corresponding to the operation mode ($M_1$) after changed.

When the engine is being operated in any one of the operation modes ① to ③ at the step 205, it is judged at a step 207 based on a value of a rich-spike flag FR whether it is required to execute the rich-spike operation for releasing NOx from the NOx occluding and reducing catalyst 7 or not. In this embodiment as described above, the ECU 30 is integrating the values of the NOx counter CNOX that represents the amount of NOx absorbed by the NOx occluding and reducing catalyst 7 based on the operating conditions of the engine, and sets the value of the rich-spike flag FR to 1 when the value of the counter CNOX has increased in excess of a predetermined value. When the rich-spike operation is now requested at the step 207, since the operation for decreasing the stored amount of oxygen (steps 213 to 217) must be executed as will be described later, the operation directly proceeds to a step 211. When the rich-spike operation is not being requested, it is judged at a step 209 whether or not the target operation mode $M_1$ is the rich air-fuel ratio operation or the stoichiometric air-fuel ratio operation (mode ④ or ⑤). When the target operation mode $M_1$ is neither the mode ④ nor the mode ⑤, the lean air-fuel ratio operation is not changed over to the rich air-fuel ratio operation. Therefore, the operation proceeds to the step 223 where the operation mode is changed over to the target mode.

When FR=1 (rich-spike is requested) at the step 207 and when the target operation mode is ④ or ④ at the step 209, the engine operating air-fuel ratio must be changed from a lean air-fuel ratio over to a rich air-fuel ratio (or to the stoichiometric air-fuel ratio). Hence, the operation proceeds to the step 211 where it is judged whether the operation for decreasing the amount of oxygen is finished or not. When this operation is not finished, the secondary fuel injection (direct cylinder fuel injection in the expansion or exhaust stroke) is executed for decreasing the amount of oxygen at steps 213 to 217 to feed the fuel that does not contribute to the combustion to the cylinders.

At the step 213, a total amount of fuel (amount of HC) necessary for consuming all oxygen stored in the SCs 5a and 5b and for maintaining the air-fuel ratio of the exhaust gas on the downstream side of the SCs 5a and 5b more rich than the stoichiometric air-fuel ratio, is calculated from the present amount of oxygen OSC stored in the SCs 5a and 5b read at the step 201, and the amount of secondary fuel injection necessary per one time is calculated by dividing the total amount of fuel by the number of times for executing the secondary fuel injection (mentioned later). At a step 215, a timing is judged for setting the amount of the secondary fuel injection in any one of the cylinders. At a timing that is set, the calculated amount of the secondary fuel injection is set at a step 217 to a fuel injection circuit. At the timing for injecting the secondary fuel (expansion or exhaust stroke), therefore, the secondary fuel injection is executed in each cylinder. When the secondary fuel injection is executed a predetermined number of times (number of the cylinders), it is judged at the step 211 that the operation for decreasing the amount of oxygen has finished, and the operations of the step 219 and of subsequent steps are executed.

When oxygen is all released from the SCs 5a and 5b after the operation for decreasing the stored amount of oxygen, it is judged at the step 219 whether the rich-spike operation is now requested (FR=1) or not. When the rich-spike operation is being requested, the rich-spike operation is executed at a step 221. When the rich-spike operation is not requested, the operation mode is changed at the step 223 over to the target operation mode $M_1$ (to the rich air-fuel ratio operation mode or to the stoichiometric air-fuel mode operation in this case).

In the rich-spike operation at the step 221, the engine is operated with the rich air-fuel ratio uniform mixture combustion of the mode ⑤ until the value of the NOx counter CNOX becomes 0, whereby NOx absorbed by the NOx occluding and reducing catalyst 7 are all released and purified by the reduction.

Next, described below is the number of times of the secondary fuel injection according to this embodiment. In this embodiment, the secondary fuel injection is effected one time for each of the group of the cylinders #1 and #4 and the group of the cylinders #2 and #3, or for each of the cylinders #1 to #4. That is, when the SCs 5a and 5b have relatively small capacities and the amount of oxygen stored in the SCs can be decreased by the secondary fuel injection of one time for each of the SCs 5a and 5b, the secondary fuel injection is executed one time only for each of the groups of the cylinders. When the SCs 5a and 5b have relatively large capacities and the stored amount of oxygen cannot be decreased to a sufficient degree by the secondary fuel injection of one time only, the secondary fuel injection is executed two times for each of the SCs 5a and 5b (i.e., one time for each of the four cylinders #1 to #4). Which one of the secondary fuel injections be executed is determined depending upon the capacities of the SCs 5a and 5b. Each group includes the cylinders for which the ignition is not effected consecutively. When the secondary fuel injection is executed one time for each of the groups of the cylinders, therefore, it is so judged at the step 211 that the operation for decreasing the stored amount of oxygen is finished if the secondary fuel injection is effected one time for each of the two cylinders for which the ignition takes place consecutively (e.g., #1 and "#3, or #3 and #2, etc.).

In this embodiment as described above, furthermore, the engine continues to operate in any one of the operation modes (① to ③) at a lean air-fuel ratio when the operation is being executed for decreasing the stored amount of oxygen.

(2) Second Embodiment

Next, a second embodiment of the present invention will be described. In the above-mentioned first embodiment, the operation for decreasing the amount of oxygen stored in the SCs 5a and 5b is executed relying on the secondary fuel injection only, and the operation mode is not changed over to the rich air-fuel ratio operation until the operation for decreasing the stored amount of oxygen (secondary fuel injection) is completed. According to this embodiment, in an engine in which the secondary fuel injection must be executed one time for each of the cylinders, the fuel injection is changed over to a suction stroke fuel injection of which the amount is increased by an amount corresponding to the amount of the secondary fuel injection for a cylinder of a timing at which the operation mode can be changed (shifted to the suction stroke fuel injection) at a moment when an instruction is issued to change the lean air-fuel ratio operation mode over to the rich air-fuel ratio operation mode, and the secondary fuel injection is effected for those cylinders that are not in time for being shifted to the suction stroke fuel injection.

Figure 3:
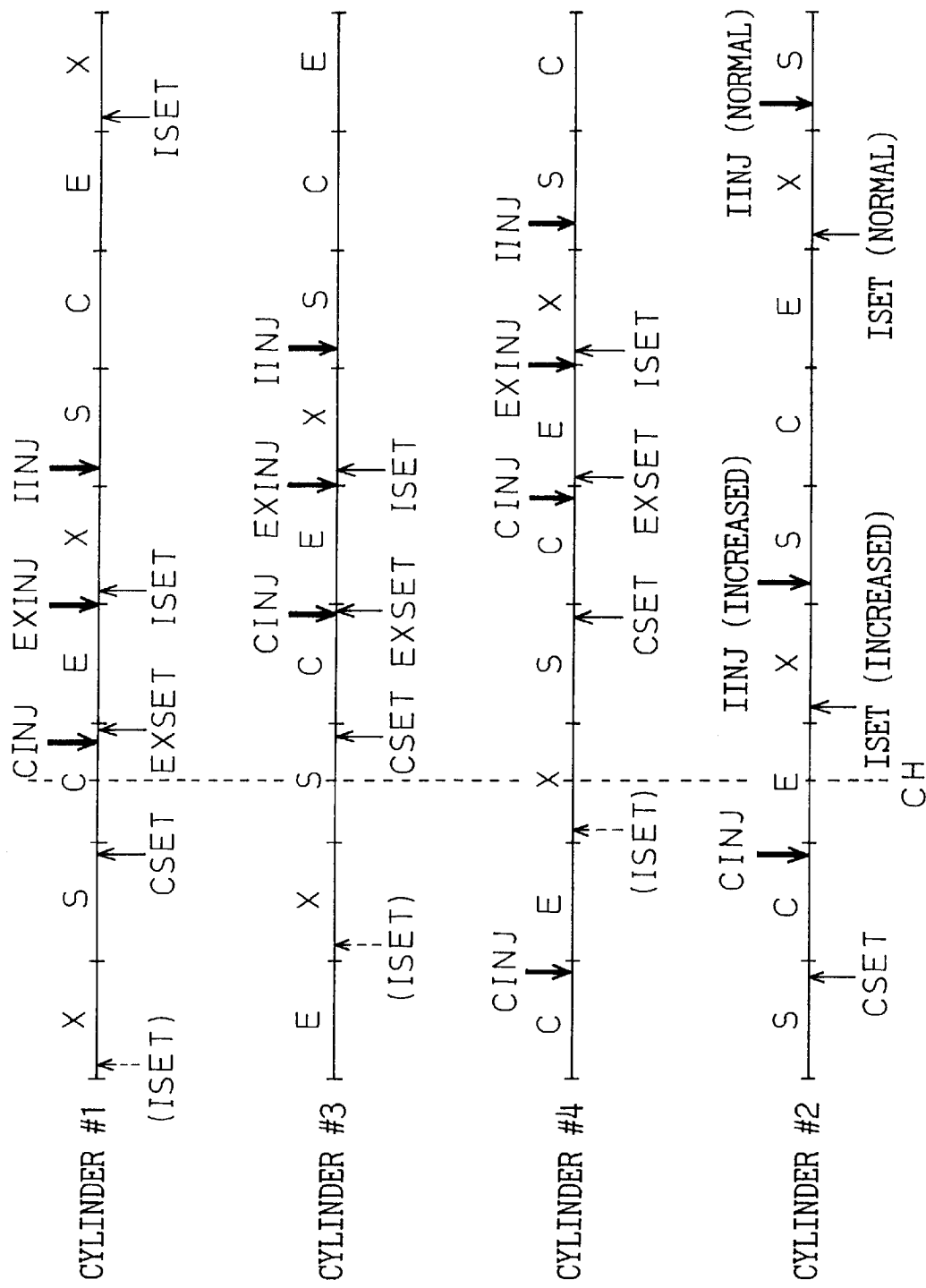
FIG. 3 is a timing diagram illustrating the operation for decreasing the stored amount of oxygen according to a second embodiment of the present invention.

FIG. 3 is a diagram illustrating the timings for effecting the secondary fuel injection (in FIG. 3, the secondary fuel injection is effected from the last period of the expansion stroke to the first period of the exhaust stroke) and for increasing the amount of the suction stroke fuel injection. FIG. 3 illustrates the timings for changing the mode ① (lean stratified charge combustion (injected one time in the compression stroke)) over to the mode ④ (stoichiometric air-fuel ratio uniform mixture combustion (injected in the suction stroke). The same as that of FIG. 3, however, also holds for the change over between other modes.

FIG. 3 illustrates the fuel injection timings for the cylinders #1 to #4 and the timings for setting the amounts of fuel injection. In FIG. 3, CSET represents the timings for setting the amount of fuel injection in the compression stroke, CINJ represents the timings for executing the fuel injection in the compression stroke, EXSET represents the timings for setting the amount of secondary fuel injection, EXINJ represents the timings for executing the secondary fuel injection, ISET represents the timings for setting the amount of fuel injection in the suction stroke, and IINJ represents the timings for executing the fuel injection in the suction stroke. In FIG. 3, furthermore, what is represented by CH is a timing for starting the operation for decreasing the stored amount of oxygen for changing over the operation mode. In FIG. 3, furthermore, (S), (C), (E) and (X) represent the suction stroke, compression stroke, expansion stroke and exhaust stroke in each cylinder. According to this embodiment as shown in FIG. 3, the amount of secondary fuel injection is set at the last period of the compression stroke (EXSET), and the amount of fuel injection in the suction stroke is set at the first period of the exhaust stroke (ISET).

If now the operation for decreasing the amount of oxygen stored in the catalyst is started at a timing CH in FIG. 3 to change over the operation mode, the timing CH corresponds to an intermediate period of the compression stroke in the cylinder #1 and the fuel injection timing (IINJ) has been finished already in the suction stroke, and the amount of fuel injection has been set in the compression stroke at a timing CSET. In the cylinder #1, therefore, the operation mode is not immediately changed over, and the fuel injection IINJ is executed in the compression stroke, the amount of the secondary fuel injection is set at a timing EXSET, and the secondary fuel injection (EXINJ) is executed.

In the cylinder #3, on the other hand, the timing CH corresponds to the intermediate period in the suction stroke. This timing, however, is after the timing for setting the amount of fuel injection in the suction stroke and, hence, the fuel injection in the suction stroke cannot be readily effected. In the cylinder #3, therefore, the fuel injection is executed in the compression stroke, the amount of fuel injection is set in the compression stroke at CSET, the amount of secondary fuel injection is set at a timing (EXSET) for setting the amount of secondary fuel injection in the last period of the compression stroke, and the secondary fuel injection is executed.

In the cylinder #4, similarly, the timing CH corresponds to the intermediate period of the exhaust stroke. In this case, too, the timing (IINJ) for setting the amount of fuel injection in the suction stroke has been passed already, and the fuel injection cannot be immediately effected in the suction stroke. Therefore, the secondary fuel injection (EXINJ) is executed while continuing the fuel injection (CINJ) in the compression stroke like in the cylinder #3.

In the cylinder #2, on the other hand, the timing CH corresponds to the intermediate period of the expansion stroke, and the timing (ISET) for setting the amount of fuel injection in the suction stroke has not been reached yet, and the fuel injection in the suction stroke can be effected. In the cylinder #2, therefore, the operation mode is changed over to effect the fuel injection in the suction stroke, and the amount of fuel injection set at ISET is increased by an amount corresponding to the amount of secondary fuel injection. That is, in the cylinder #2, the operation mode is changed over without effecting the secondary fuel injection but, instead, the amount of fuel injection is set by adding the amount corresponding to the amount of secondary fuel injection to the amount of fuel injection in the suction stroke after the operation mode is changed over.

In this embodiment, as will be understood from the timing chart of FIG. 3, the secondary fuel injection is executed while continuing the fuel injection in the compression stroke (i.e., without changing over the operation mode) for the cylinders (cylinders #1, #3, #4 in the case of FIG. 3) in which the timing for setting the amount of secondary fuel injection takes place earlier than the timing for setting the amount of fuel injection in the suction stroke after the start of the operation for decreasing the amount of oxygen stored in the catalyst for changing the operation mode. For the cylinder (cylinder #2) in which the timing for setting the amount of fuel injection in the suction stroke is taking place earlier than the timing for setting the amount of secondary fuel injection, however, the fuel injection in the suction stroke is effected by changing over the operation mode, and the fuel is increased by an amount corresponding to the amount of secondary fuel injection for other cylinders at the time of the fuel injection in the suction stroke. In this case, too, the operation for decreasing the amount of oxygen stored in the catalyst ends at a moment when the secondary fuel is injected or when the amount of fuel injection in the suction stroke is increased one time for each of the cylinders. Thereafter, the operation mode is changed over in all cylinders.

That is, in this embodiment, the operation for decreasing the amount of oxygen stored in the catalyst starts (cylinders #1, #3, #4) before the operation mode is changed over and ends after the operation mode is changed over (cylinder #2). This makes it possible to shorten the time for changing over the operation mode.

Figure 4:
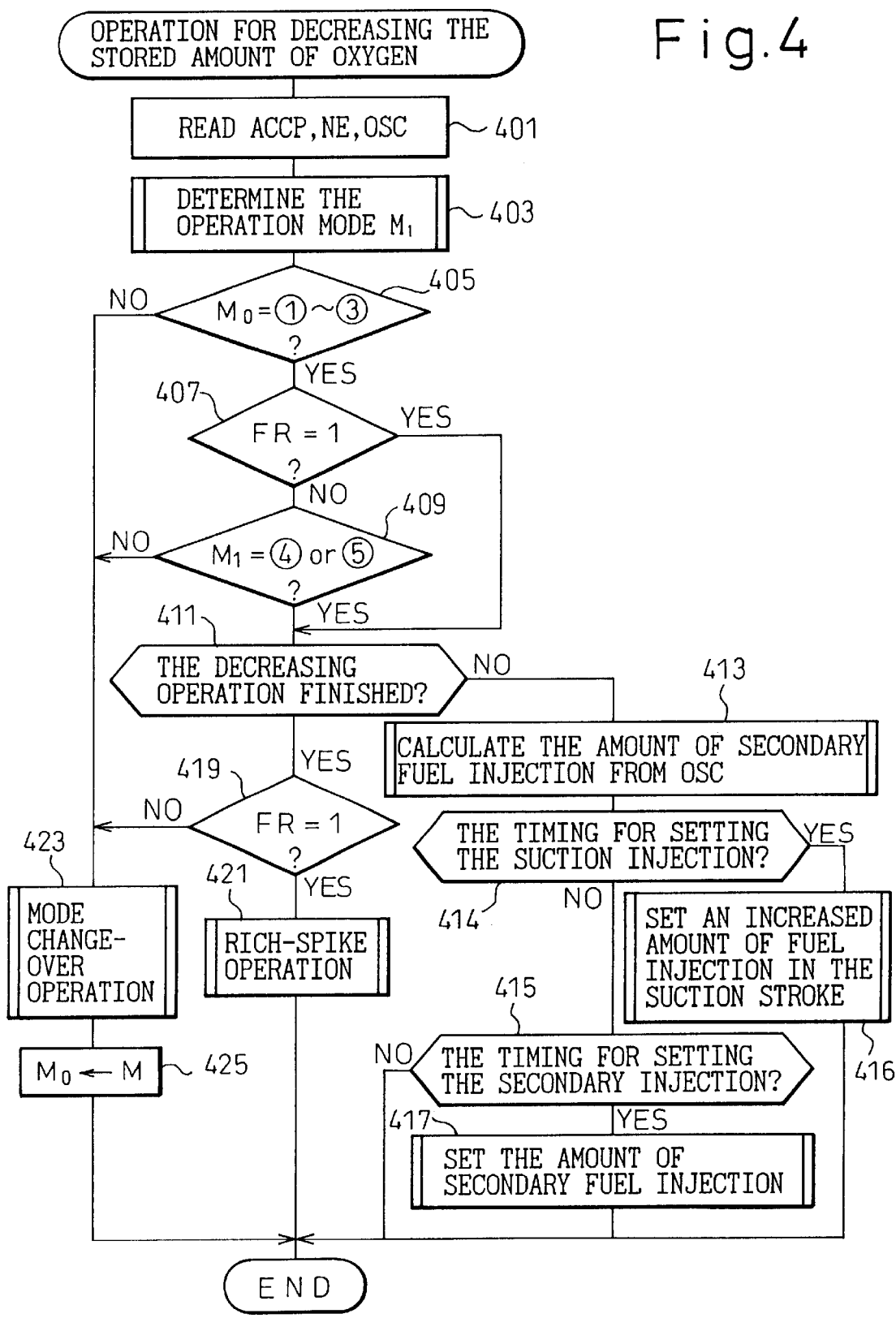
FIG. 4 is a flow chart illustrating the operation for decreasing the stored amount of oxygen according to the second embodiment of the present invention.

FIG. 4 is a flow chart illustrating the operation for decreasing the stored amount of oxygen according to the embodiment. The operation of FIG. 4 is conducted as a routine executed by the ECU 30 at a predetermined interval. The flow chart of FIG. 4 is different from the flow chart of FIG. 2 in that the steps 213 to 217 in the flow chart of FIG. 2 are replaced by the steps 413, 414, 415, 416 and 417. Therefore, only differences will be described below.

At a step 413, the amount of secondary fuel injection at one time is set in accordance with the amount of oxygen OSC stored in the SCs 5a and 5b as in the step 213 of FIG. 2. When the timing at a step 414 is for setting the present amount of fuel injection in the suction stroke (ISET in FIG. 3), the amount increased by adding the amount of secondary fuel injection calculated at the step 413 to the amount of fuel injection in the suction stroke after the operation mode is changed over, is set as the amount of fuel injection in the suction stroke at a step 416. When the timing is not for setting the amount of fuel injection in the suction stroke, the amount of secondary fuel injection is set at steps 415 and 417. Thus, the operation mode is changed over and the amount of fuel injection is increased instead of effecting the secondary fuel injection in the cylinders which are in time for the timing (ISET) for setting the amount of fuel injection in the suction stroke.

In this embodiment, the operation for decreasing the stored amount of oxygen is carried out by executing the secondary fuel injection in the cylinders other than those cylinders which are in time for the timing for setting the amount of fuel injection in the suction stroke. It is, however, also allowable to increase the amount of fuel injection in the suction stroke by an amount corresponding to the amount of secondary fuel injection as in the above-mentioned cylinder #2 for each of the cylinders starting from the next timing for setting the amount of fuel injection in the suction stroke without executing the secondary fuel injection. In this case, the operation for decreasing the amount of oxygen stored in the catalyst is executed immediately after the operation mode is changed over in each cylinder.

(3) Third Embodiment

Described below next is a third embodiment of the present invention. In the above-mentioned first embodiment, the operation mode of the engine is changed over after the operation for decreasing the amount of oxygen stored in the catalyst is completed. In the second embodiment, the operation for decreasing the stored amount of oxygen is executed immediately after the operation mode is changed over in some cylinders or in all cylinders. According to this embodiment, on the other hand, the operation for decreasing the stored amount of oxygen is executed independently of the change-over of the operation mode. That is, in each cylinder, the operation mode is changed over in a normal manner, and the secondary fuel injection is executed irrespective of the operation mode until the operation mode is changed over in each of the cylinders. In the practical operation, it may often become necessary to shift, for example, a very lean combustion state of the mode ① (lean air-fuel ratio stratified combustion (fuel is injected one time in the compression stroke)) to a rich air-fuel ratio combustion of the mode ⑤ (rich air-fuel ratio uniform mixture combustion (fuel is injected one time in the suction stroke)) due to quick acceleration or the like. In such a case, when the operation is changed from the mode ① directly to the mode ⑤, the output torque may often change sharply due to a great change in the combustion air-fuel ratio. In this case, therefore, the operation is not directly changed from the mode ① to ⑤ but may be changed from the mode ① to the mode ② (lean air-fuel ratio uniform mixture/stratified charge combustion (fuel is injected two times in the suction stroke and compression stroke), to the mode ③ (lean air-fuel ratio uniform mixture combustion (fuel is injected one time in the suction stroke) and then to the mode ⑤.

In this embodiment, the change-over operations such as the above-mentioned ①→②→③→⑤ and the like are independently executed at the time of changing over the operation mode and, at the same time, the secondary fuel injection is executed until the change-over of the mode is finished. That is, in this embodiment, the operation mode is changed over in parallel with the operation for decreasing the amount of oxygen stored in the catalyst. Accordingly, the time for changing over the operation mode is not affected by the operation for decreasing the stored amount of oxygen.

Figure 5:
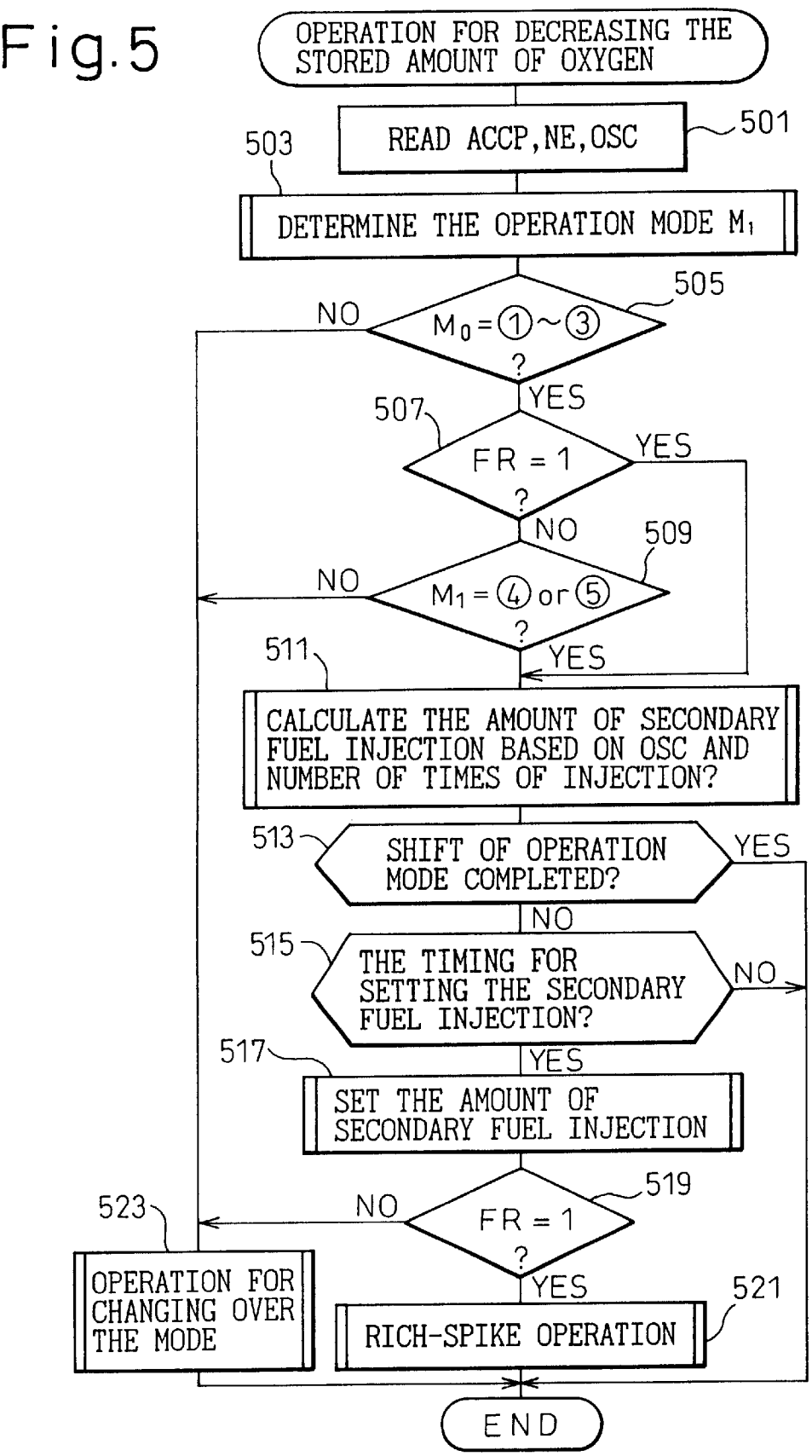
FIG. 5 is a flow chart illustrating the operation for decreasing the stored amount of oxygen according to a third embodiment of the present invention.

FIG. 5 is a flow chart illustrating the operation for decreasing the amount of oxygen stored in the catalyst according to the embodiment. This operation is conducted as a routine executed by the ECU 30 after every predetermined time interval.

In FIG. 5, the steps 501 to 509 represent the same operations as the steps 201 to 209 of FIG. 2. In this embodiment, too, when the operation mode is not changed from a lean air-fuel ratio to a rich air-fuel ratio through the steps 501 to 509, the routine readily proceeds to a step 523 where the mode is changed over depending upon the target operation mode $M_1$ and the present operation mode $M_0$.

When the operation mode must be changed from the lean air-fuel ratio operation to the rich air-fuel ratio operation through the steps 501 to 509, the routine proceeds to a step 511 where it is calculated how many times the secondary fuel injection can be executed from the target operation mode $M_1$ and the present operation mode $M_0$ based on the number of cycles required for shifting $M_0$ to $M_1$, and the amount of secondary fuel injection per one time is calculated from the number of times the secondary fuel injection is executed and the present stored amount of oxygen OSC. The amount of secondary fuel injection is calculated as an amount capable of consuming all oxygen released from the SCs 5a and 5b, and for maintaining a rich air-fuel ratio in the exhaust gas on the downstream side of the SCs 5a and 5b.

After the amount of secondary fuel injection is calculated, the secondary fuel injection is executed at steps 513 to 521 until the change-over of the operation mode is finished. In this case, further, at steps 521 and 523, the operation is shifted to the rich-spike operation (step 521) in parallel with the secondary fuel injection, and the shifting of the operation mode is performed in accordance with the present operation mode $M_0$ and the target operation mode $M_1$. When the shift of operation is finished at the step 513 or 521, it is judged at the step 513 that the change-over of the mode has finished, and the secondary fuel injection is terminated.

Next, described below is the method of estimating the amount OSC of oxygen stored in the SCs 5a and 5b used for calculating the amount of secondary fuel injection in the above-mentioned embodiments. In this embodiment, the amount of oxygen OSC stored in the SCs 5a and 5b is calculated from the air-fuel ratio AF of exhaust gas at the inlet of the SCs 5a and 5b detected by the air-fuel ratio sensors 29a and 29b, and from the weight flow rate GA of the air (grams/second) taken in by the engine.

Due to the $O_2$ storage capability of the catalyst as described earlier, an excess of oxygen in the exhaust gas is absorbed by the SCs 5a and 5b when the air-fuel ratio of the exhaust gas flowing into the SCs 5a and 5b is on the lean side of the stoichiometric air-fuel ratio, and absorbed oxygen is released from the SCs 5a and 5b when the air-fuel ratio of the exhaust gas flowing into the SCs 5a and 5b is on the rich side of the stoichiometric air-fuel ratio. In either case, therefore, the air-fuel ratio of the exhaust gas at the outlet of the SCs 5a and 5b becomes close to the stoichiometric air-fuel ratio. Therefore, the amount of oxygen absorbed by the SCs 5a and 5b or released from the SCs 5a and 5b, corresponds to the amount of oxygen necessary for the exhaust gas to acquire the stoichiometric air-fuel ratio.

If the weight of the air required for forming exhaust gas having an air-fuel ratio AF by burning the fuel of a given amount F is denoted by GA, then, $GA = AF \times F$. Furthermore, if the weight of the air necessary for forming exhaust gas having the stoichiometric air-fuel ratio ST by burning the fuel in the same amount F is denoted by GA', then, $GA' = ST \times F$. If the oxygen concentration in the air is $AO_2$, then, the amount (weight) of oxygen contained in the air of the weight GA and GA' is $AO_2 \times GA$ and $AO_2 \times GA'$, respectively. That is, the amount of oxygen necessary for forming exhaust gas having the stoichiometric air-fuel ratio ST by burning the fuel of a given amount F is expressed by $AO_2 \times GA' = AO_2 \times ST \times F$. On the other hand, the amount of oxygen for forming exhaust gas having an air-fuel ratio AF by burning the fuel in the same amount is expressed by $AO_2 \times GA = AO_2 \times AF \times F$. Therefore, the amount of oxygen necessary for turning the exhaust gas having the air-fuel ratio AF into the exhaust gas having the stoichiometric air-fuel ratio, i.e., the amount of oxygen absorbed by the SCs 5a and 5b when AF>ST, becomes $(AO_2 \times GA) - (AO_2 \times GA') = AO_2 \times F \times (AF - ST)$. Since $F = GA/AF$, the amount of oxygen released and absorbed becomes $AO_2 \times GA \times (AF - ST)/AF = AO_2 \times GA \times (\Delta AF/AF)$, where $\Delta AF = (AF - ST)$. Symbol GA represents the flow rate of the air per a unit time (seconds). When AF>ST, therefore, oxygen is absorbed by an amount $AO_2 \times GA \times (\Delta AF/AF)$ by the catalyst per a unit time while the engine is in operation, and the amount of oxygen OSC stored in the catalyst increases by $AO_2 \times GA \times (\Delta AF/AF)$ (when AF<ST, $\Delta AF$ acquires a minus sign, and the amount of oxygen OSC stored in the catalyst decreases).

When the air-fuel ratio of the exhaust gas is AF and the weight flow rate of the air taken in is GA, therefore, a change in the amount of oxygen OSC stored in the SCs 5a and 5b per a time $\Delta t$ is expressed as $AO_2 \times GA \times (\Delta AF/AF) \times \Delta t$. In practice, however, a change in the OSC is affected by the releasing rate of oxygen from the catalyst. Therefore, a practical change in the OSC is expressed as $AO_2 \times GA \times (\Delta AF/AF) \times \Delta t \times K$ (where K is a correction coefficient based on the rate of absorbing or releasing oxygen). In practice, furthermore, the rate of absorbing or releasing oxygen is affected by the catalyst temperature, and increases with an increase in the catalyst temperature. Moreover, the rate differs depending upon whether the oxygen is absorbed or released; i.e., the rate of absorbing oxygen is larger than the rate of releasing oxygen. In this embodiment, therefore, the change in the OSC per the time $\Delta t$ is expressed by the following formulas depending upon when oxygen is absorbed ($AF \geq ST$) and when oxygen is released (AF<ST).

When absorbed ($AF \geq ST$): $AO_2 \times GA \times (\Delta AF/AF) \times \Delta t \times A$, When released (AF<ST): $AO_2 \times GA \times (\Delta AF/AF) \times \Delta t \times B$, where A and B are correction coefficients determined by the rate of absorbing or releasing oxygen and the catalyst temperature.

FIG. 6 is a flow chart illustrating the operation for calculating the amount of oxygen stored in the SCs 5a and 5b according to this embodiment. This operation is conducted as a routine executed by the ECU 30 at a predetermined interval corresponding to $\Delta t$ mentioned above. In this operation, a change in the amount of oxygen OSC stored in the SCs 5a and 5b per the time $\Delta t$ is calculated by using the above-mentioned formulas, and the amount of change from the start of the engine is integrated to estimate the present amount of oxygen OSC stored in the SCs 5a and 5b.

In the operation of FIG. 6, first, the air-fuel ratio AF of the exhaust gas at the inlet of SCs 5a and 5b, the weight flow rate GA of the air taken in by the engine, and the temperature TCAT of the SCs 5a and 5b, are read at a step 601. In this embodiment, the air-fuel ratio of the exhaust gas is found as an average value of the air-fuel ratios of the exhaust gas detected by the air-fuel sensors 29a and 29b at the inlet ports of the SCs 5a and 5b. The weight flow rate GA of the air taken in is calculated as a product of the amount of fuel (amount of fuel injection) fed to the engine per a unit time and the air-fuel ratio AF of the exhaust gas. The temperature TCAT of the SCs 5a and 5b may be measured by disposing temperature sensors on the catalyst beds. Alternatively, a relationship among the load on the engine (amount of fuel injection), the rotational speed and the exhaust gas temperature, may have been found in advance, and the exhaust gas temperature may be calculated based on the engine fuel injection amount (load on the engine) and the rotational speed, so that TCAT is approximated by the exhaust gas temperature.

After AF, GA and TCAT are read as described above, it is judged at a step 603 whether AF≧ST (ST is the stoichiometric air-fuel ratio) or not. When AF≧ST, the exhaust gas purifying catalyst is now absorbing oxygen and the stored amount of oxygen OSC is increasing. At a step 605, therefore, the correction coefficient A is calculated from the rate of absorbing oxygen by the SCs 5a and 5b and the catalyst temperature TCAT. At a step 607, the stored amount of oxygen OSC is increased by (AO$_2$×GA×(ΔAF/AF)×Δt× A). Then, at a step 609, the value of OSC is set to OSC$_{MAX}$ when the value of OSC after increased exceeds a maximum value OSC$_{MAX}$. Here, OSC$_{MAX}$ represents a maximum amount of oxygen (saturated amount) stored in the SCs 5a and 5b.

On the other hand, when AF<ST at the step 603, the SCs 5a and 5b are now releasing oxygen. Therefore, the correction coefficient B is calculated at a step 613 based on the rate of releasing oxygen and the catalyst temperature TCAT. At a step 615, the value of OSC is increased by (AO$_2$×GA× (ΔAF/AF)×Δt×B)(in this case, ΔAF<0 and, hence, OSC decreases). At steps 617 and 619, the value of OSC is limited by a minimum value 0, and the operation of this time ends. At the start of the engine, the initial value of OSC at the steps 607 and 615 is set to OSC$_{MAX}$. When the engine comes to a halt, the SCs 5a and 5b are exposed to the open air (lean air-fuel ratio), and are saturated with oxygen.

By using the amount of oxygen OSC stored in the catalyst as estimated by the operation of FIG. 6, the amount of fuel necessary for the operation for decreasing the amount of oxygen stored in the SCs 5a and 5b is calculated. In the above-mentioned embodiments, therefore, the operation is executed for correctly decreasing the stored amount of oxygen, and unpurified NOx are not released from the NOx occluding and reducing catalyst 7 at the time when the engine operating mode is changed from a lean air-fuel ratio over to a rich air-fuel ratio.

Figure 7A:
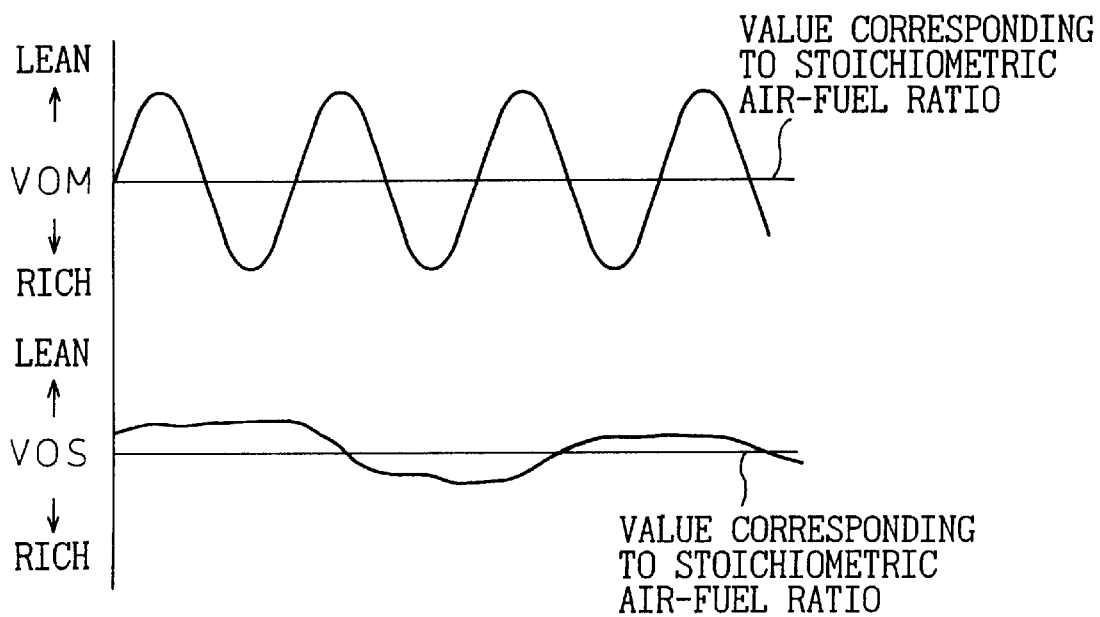
FIGS. 7(A) and 7(B) are diagrams illustrating changes in the outputs of the upstream air-fuel ratio sensor and the downstream air-fuel ratio sensor depending upon the degree of deterioration of the exhaust gas purifying catalyst.
Figure 7B:
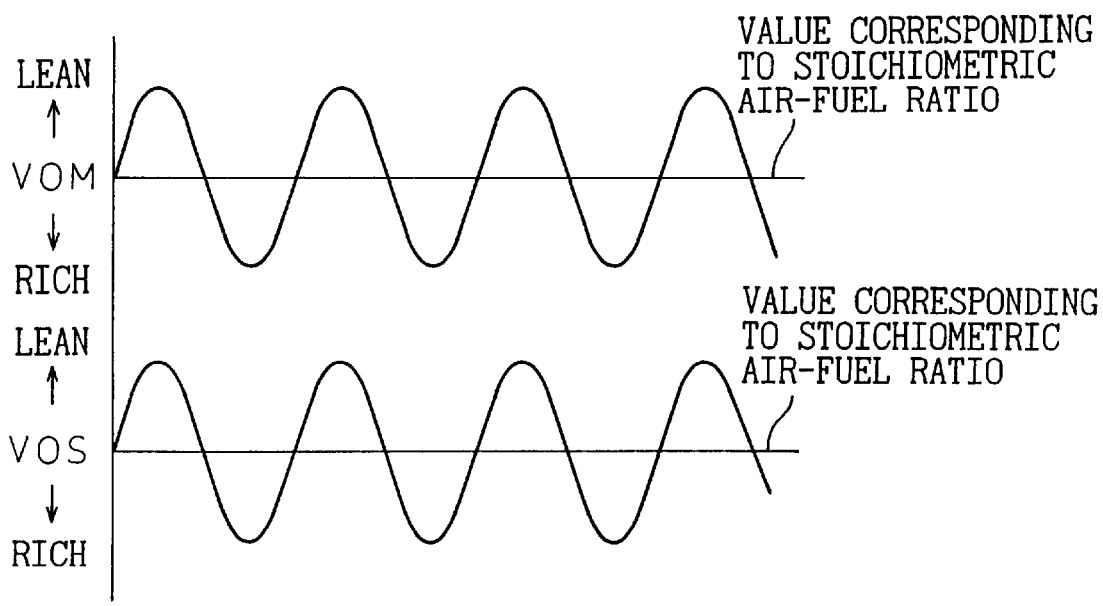
Figure 8:
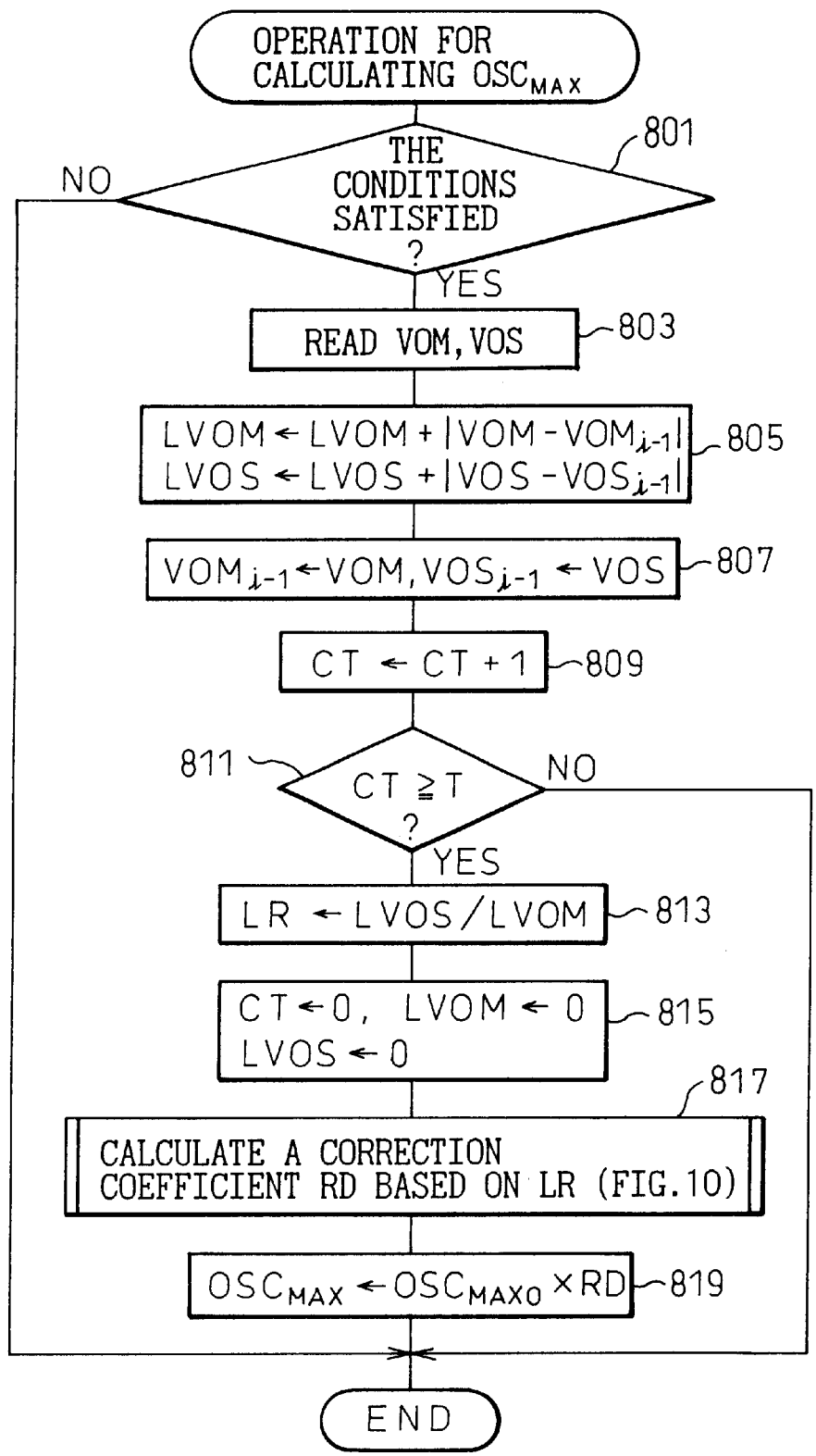
FIG. 8 is a flow chart illustrating the operation for estimating the stored amount of oxygen by taking the deterioration of the exhaust gas purifying catalyst into consideration.
Figure 9:
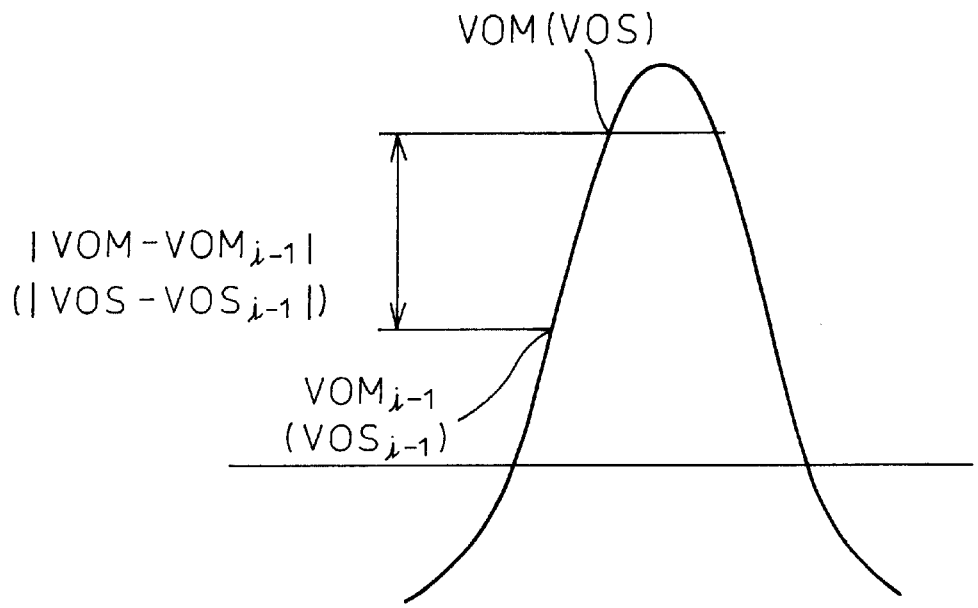
FIG. 9 is a diagram illustrating the operation for calculating the lengths of the output response curves of the air-fuel sensors used in the operation of FIG. 8.

Next, described below, with reference to FIGS. 7 to 9, is how to correct the saturated oxygen amount OSC$_{MAX}$ of the SCs 5a and 5b used for the operation of FIG. 6. In the operation of FIG. 6, the stored amount of oxygen OSC may be calculated presuming that the saturated oxygen amount OSC$_{MAX}$ is a suitable predetermined value. More correctly, however, it is desired to correct the value of OSC$_{MAX}$ depending upon the deterioration of the catalyst. The O$_2$ storage capability of the catalyst decreases as the catalyst deteriorates, and a maximum oxygen amount (saturation amount) OSC$_{MAX}$ that can be stored by the catalyst decreases, too. In this embodiment, therefore, the deteriorated state of the catalyst is discriminated, and the value of OSC$_{MAX}$ is corrected depending upon the deteriorated state.

First, described below is a method of discriminating the deteriorated state of the catalyst. In this embodiment, the deteriorated state of the catalyst is judged based on the length of the output response curve of the air-fuel sensors 29a and 29b on the upstream side of the SCs 5a and 5b and on the length of the output response curve of the air-fuel ratio sensor 31 on the downstream side of the NOx occluding and reducing catalyst 7.

FIGS. 7(A) and 7(B) illustrate general waveforms of the output VOM of the air-fuel sensor provided on the upstream side of the exhaust gas purifying catalyst and of the output VOS of the air-fuel ratio sensor provided on the downstream side of the catalyst when the engine air-fuel ratio is controlled by feedback to acquire the stoichiometric air-fuel ratio. FIG. 7(A) shows the waveforms of when the exhaust gas purifying catalyst has a large O$_2$ storage capability and FIG. 7(B) shows the waveforms of when the O$_2$ storage capability has decreased.

As shown in the FIGS. 7(A) and 7(B), in a state where the engine air-fuel ratio is controlled by feedback to acquire the stoichiometric air-fuel ratio, the engine air-fuel ratio (exhaust gas air-fuel ratio) fluctuates between the rich side and the lean side within a relatively small range with the stoichiometric air-fuel ratio as a center. Therefore, the output VOM of the air-fuel ratio sensor on the upstream side periodically fluctuates with the stoichiometric air-fuel ratio as a center. Here, when the catalyst has a sufficiently large O$_2$ storage capability, the air-fuel ratio of the exhaust gas at the outlet of the catalyst is maintained at a value close to the stoichiometric air-fuel ratio despite the air-fuel ratio of the exhaust gas flowing into the catalyst fluctuates to some extent with the stoichiometric air-fuel ratio as a center. When the catalyst has a sufficiently large O$_2$ storage capability, therefore, the output VOS of the air-fuel ratio sensor on the downstream side does not fluctuate much as shown in FIG. 7(A). Accordingly, the length along the output response curve VOS becomes relatively small. As the catalyst deteriorates, however, since the O$_2$ storage capability decreases, the rate for absorbing or releasing oxygen of the catalyst decreases, and the air-fuel ratio on the downstream side fluctuates in response to the fluctuation in the air-fuel ratio on the upstream side. Accordingly, the length LVOS of the output response curve VOS of the air-fuel ratio sensor on the downstream side increases with a decrease in the O$_2$ storage capability. In a state where the O$_2$ storage capability is completely lost as shown in FIG. 7(B), the length LVOS of the output response curve VOS of the air-fuel sensor on the downstream side becomes equal to the length LVOM of the output response curve VOM of the air-fuel sensor on the upstream side. That is, the ratio LR (LR=LVOS/LVOM) of the length LVOM of the output response curve VOM of the air-fuel ratio sensor on the upstream side to the length LVOS of the output response curve VOS of the air-fuel ratio sensor on the downstream side while the air-fuel ratio is being controlled by feedback, becomes very much smaller than 1 when the O$_2$ storage capability is sufficiently large and increases to approach 1 as the O$_2$ storage capability decreases. In this embodiment, the ratio LR of the length of the output response curve of the air-fuel ratio sensor 31 on the downstream side to the length of the output response curve of the air-fuel ratio sensors 29a, 29b on the upstream side, is used as a parameter that represents the reduction in the O$_2$ storage capability of the SCs 5a and 5b. When the engine has two exhaust gas purifying catalysts 5a, 5b and two air-fuel ratio sensors 29a, 29b on the upstream side as in this embodiment, an average value of the outputs of the two air-fuel ratio sensors 29a and 29b on the upstream side may be used as the output VOM of the air-fuel ratio sensor on the upstream side to calculate the length LVOM of the output response curve. Or, the length of the output response curve may be calculated for each of the air-fuel ratio sensors 29a and 29b, and an average value of the two output response curve lengths may be used as the length LVOM of the output response curve of the air-fuel ratio sensor on the upstream side.

FIG. 8 is a flow chart illustrating the operation for calculating a maximum stored amount of oxygen OSC$_{MAX}$ by taking the deterioration of the SCs 5a and 5b into consideration according to this embodiment. This operation is conducted as a routine executed by the ECU 30 after every predetermined time interval.

When the operation starts in FIG. 8, it is judged at a step 801 whether the conditions for executing the operation of deterioration parameter hold or not. In this embodiment, the conditions at the step 801 are that the engine is operating in the mode ④ (stoichiometric air-fuel ratio uniform mixture combustion, fuel is injected one time in the suction stroke) and that the air-fuel ratio is being feedback controlled based on the air-fuel ratio sensors 29a and 29b. To use the ratio LR of the lengths of the output response curves as a parameter for representing the $O_2$ storage capability of the catalyst as described with reference to FIGS. 7(A) and 7(B), the ratio LR of the output response curves must be calculated in a state where the engine air-fuel ratio is feedback controlled to acquire the stoichiometric air-fuel ratio.

When the conditions are satisfied at the step 801, the output voltages VOM of the air-fuel ratio sensors 29a, 29b on the upstream side and the output voltage VOS of the air-fuel ratio sensor 31 on the downstream side are read at a step 803. In this embodiment, an average value of the output voltages of the sensors 29a and 29b is used as VOM. Then, at a step 805, the length LVOM of the output response curve VOM of the air-fuel ratio sensor on the upstream side and the length LVOS of the output response curve VOS of the air-fuel ratio sensor on the downstream side, are calculated as, $$\text{LVOM}=\text{LVOM}+|\text{VOM}-\text{VOM}_{i-1}|$$

$$\text{LVOS}=\text{LVOS}+|\text{VOS}-\text{VOS}_{i-1}|$$

where $\text{VOM}_{i-1}$ and $\text{VOS}_{i-1}$ are values of VOM and VOS of when the operation was last executed, and are updated at a step 807 after every calculation of LVOM and LVOS. That is, in this embodiment as shown in FIG. 9, the approximation operation is conducted to use the integrated values of $|\text{VOM}-\text{VOM}_{i-1}|$ and $|\text{VOS}-\text{VOS}_{i-1}|$ as LVOM and LVOS, respectively.

At steps 809 and 811, operations are conducted for judging the periods for calculating the lengths of the output response curves. In this embodiment, the integration of the LVOM and LVOS is conducted until the value of the counter CT which is increased by 1 at every execution of the operation reaches a predetermined value T. The predetermined value T is so set that the sum of the integrated period becomes about several tens of seconds.

When the period T has passed at the step 811, the ratio LR of the lengths of the output response curves is calculated as LR=LVOS/LVOM from the values LVOM and LVOS that are integrated within the period. At a step 815, furthermore, a correction coefficient RD for $\text{OSC}_{MAX}$ is found from the ratio LR of the lengths of the output response curves ($O_2$ storage capability parameter) based on a relationship that has been set in advance. At a step 819, a maximum amount of oxygen $\text{OSC}_{MAX}$ now stored in the SCs 5a and 5b is calculated as $\text{OSC}_{MA}=\text{OSC}_{MAX0}\times\text{RD}$, where $\text{OSC}_{MAX0}$ is a maximum stored amount of oxygen of when the SCs 5a and 5b are quite new and have not been deteriorated at all.

Figure 10:
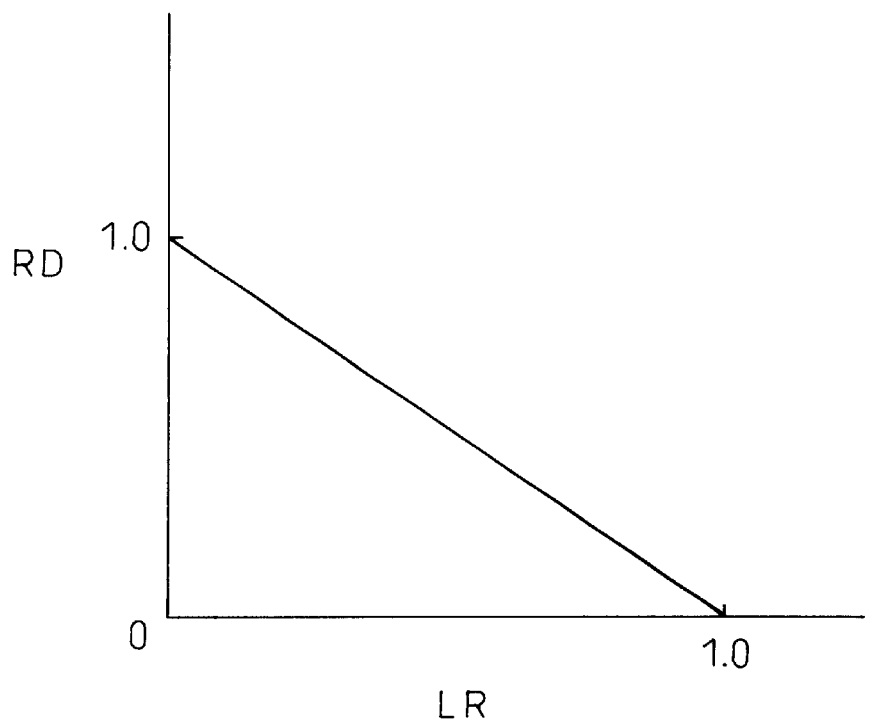
FIG. 10 is a diagram illustrating a relationship between the coefficient for correcting the $O_2$ storage capability of the exhaust gas purifying catalyst and the ratio of the curve lengths.

FIG. 10 is a graph showing a relationship between the ratio LR of the lengths of the output response curves and the correction coefficient RD, used for finding the correction coefficient RD at the step 817 in FIG. 8. As shown in FIG. 10, the value of the correction coefficient RD is set to 1.0 in a state where the catalyst is not quite deteriorated (LR<<1.0) and decreases as the catalyst deteriorates (as the value LR approaches 1).

By setting the maximum amount of oxygen $\text{OSC}_{MAX}$ stored in the SCs 5a and 5b in accordance with the degree of deterioration of the catalyst as shown in FIG. 10, the precision of estimating the amount of oxygen OSC stored in the SCs 5a and 5b in the above-mentioned embodiments can be improved, and the operation can be executed more correctly for decreasing the stored amount of oxygen in the above-mentioned embodiments.

In the above-mentioned embodiments, the regenerating operation is effected for the NOx occluding and reducing catalyst based on the value of the NOx counter CNOX. Therefore, when the value of the NOx counter CNOX does not correctly correspond to the amount of NOx occluded by the NOx occluding and reducing catalyst, the regenerating operation is not properly executed and worsening of the exhaust gas may occur.

In the engine 1 shown in FIG. 1, as explained above, the SCs 5a and 5b having the $O_2$ storage capability are disposed in the exhaust gas passages upstream of the NOx occluding and reducing catalyst 7. As described above, therefore, when the exhaust gas having a rich air-fuel ratio from the engine flows into the SCs 5a and 5b after the engine operating air-fuel ratio of the engine is changed from the lean side to the rich side, the exhaust gas having an air-fuel ratio close to the stoichiometric air-fuel ratio flows into the NOx occluding and reducing catalyst 7 downstream of the SCs 5a and 5b as long as oxygen is released from the SCs 5a and 5b; i.e., exhaust gas having a rich air-fuel ratio does not readily arrive at the NOx occluding and reducing catalyst 7. Near the stoichiometric air-fuel ratio, on the other hand, NOx are released at a very small rate from the NOx occluding and reducing catalyst. In practice, therefore, the amount of NOx occluded by the NOx occluding and reducing catalyst does not almost decrease when the air-fuel ratio of the exhaust gas is maintained near the stoichiometric air-fuel ratio. In this case, if the value of the NOx counter CNOX is decreased immediately after the engine operating air-fuel ratio has become rich, then, the value of the NOx counter decreases though NOx have not really been released from the NOx occluding and reducing catalyst 7, and the value of CNOX becomes smaller than the actual occluded amount of NOx. The difference between the actual occluded amount of NOx and the value of the NOx counter increases with an increase in the amount of oxygen stored in the SCs 5a and 5b.

A similar problem arises when the engine returns from a rich air-fuel ratio to a lean air-fuel ratio, too. In this case, oxygen in the exhaust gas is absorbed by the SCs 5a and 5b even after the air-fuel ratio of the exhaust gas flowing into the SCs 5a and 5b has become lean. Therefore, the air-fuel ratio of the exhaust gas after having passed through the SCs 5a and 5b is maintained near the stoichiometric air-fuel ratio until the SCs 5a and 5b are saturated with oxygen. Accordingly, the value of the NOx counter only increases despite the amount of NOx actually occluded by the NOx occluding and reducing catalyst not increasing. In this case, therefore, the value of the NOx counter becomes larger than the actual occluded amount of NOx. The difference between the value of the NOx counter and the actual occluded amount of NOx increases with an increase in the maximum amount of oxygen stored in the SCs 5a and 5b. Thus, as the difference occurs between the value of the NOx counter CNOX and the actual occluded amount of NOx, it may become difficult to properly set the timing of the operation for releasing NOx from the NOx occluding and reducing catalyst 7. For example, when the value of the NOx counter becomes smaller than the actual occluded amount of NOx at the time when the rich-spike operation is executed, since the value of the NOx counter decreases down to a predetermined value despite NOx still remaining in the NOx occluding and reducing catalyst 7 during the rich-spike operation, and the rich-spike operation is discontinued. In this case, the absorption of NOx is resumed in a state where the NOx occluding and reducing catalyst 7 is not recovering its occluding capability to a sufficient degree, and it becomes difficult to utilize the occluding ability of the NOx occluding and reducing catalyst to a sufficient degree. When the value of the NOx counter becomes larger than the really occluded amount of NOx during the operation at a lean air-fuel ratio, furthermore, the value of the NOx counter only increases up to a predetermined value despite the amount of NOx occluded by the NOx occluding and reducing catalyst is not really so much increasing, and the rich-spike operation is commenced undesirably.

An embodiment of the present invention described below prevents a problem that stems from the difference between the value of the NOx counter and the really occluded amount of NOx.

(4) Fourth Embodiment

Figure 11:
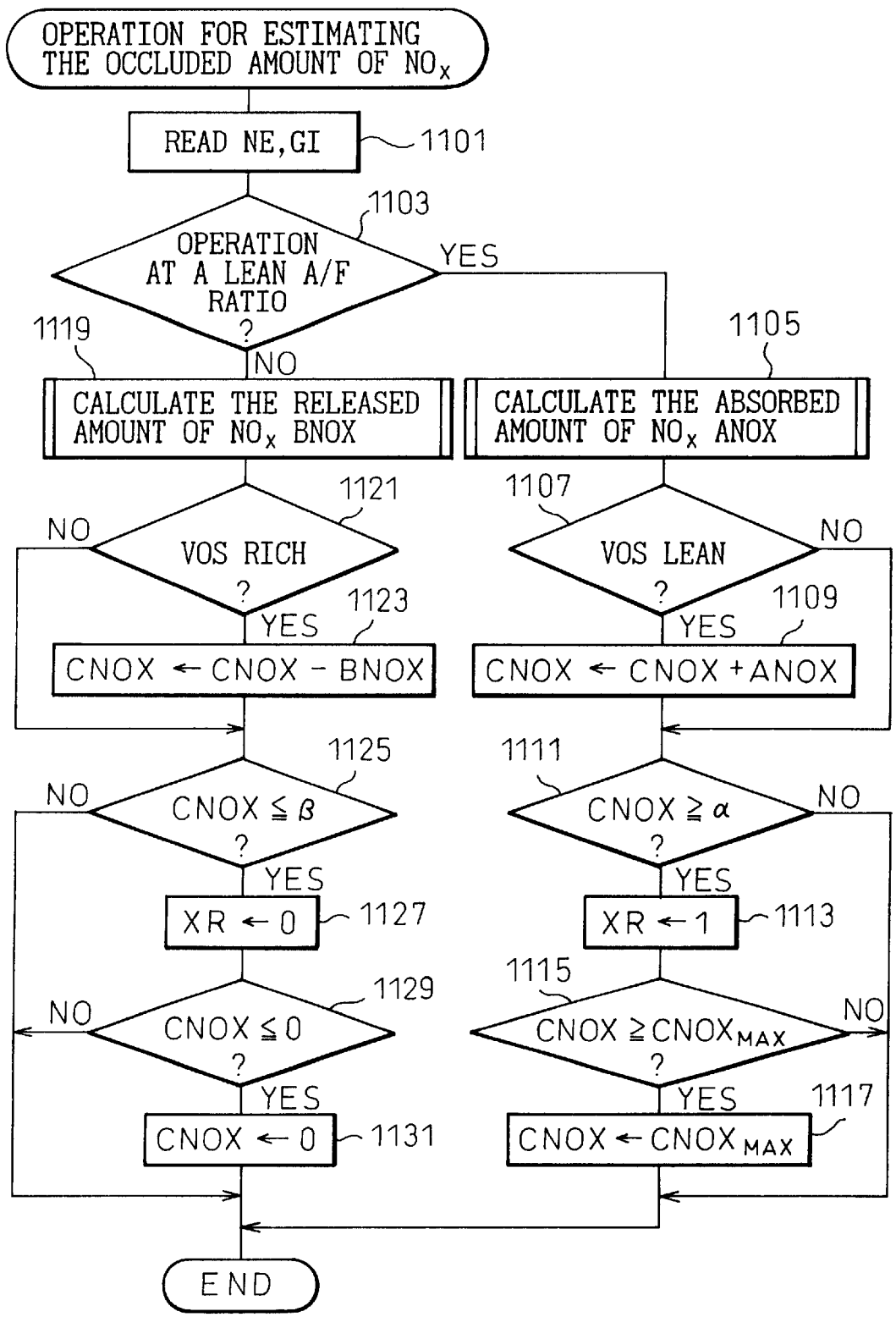
FIG. 11 is a flow chart illustrating the operation for estimating the amount of NOx occluded by an NOx occluding and reducing catalyst according to a fourth embodiment of the present invention.

FIG. 11 is a flow chart illustrating the operation for estimating the occluded amount of NOx according to a fourth embodiment of the present invention. This operation is conducted as a routine executed by the ECU 30 at a predetermined interval.

As the operation of FIG. 11 starts, the engine rotational speed NE and the fuel injection amount GI are read at a step 1101. Then, at a step 1103, it is judged whether the present exhaust gas from the engine is acquiring a lean air-fuel ratio based on the output VOM of the air-fuel ratio sensors 29a and 29b on the upstream side, i.e., whether the engine 1 is now operating at a lean air-fuel ratio. In this embodiment, there are provided two air-fuel ratio sensors on the upstream side, and an average output of the sensors 29a and 29b is used as VOM.

When the operation is now executed at a lean air-fuel ratio at the step 1103, the routine then proceeds to a step 1105 where the amount ANOX of NOx absorbed by the NOx occluding and reducing catalyst 7 in the present engine operating condition is calculated per a unit time (i.e., time interval for executing the operation). In this embodiment as described before, the amount ANOX of NOx absorbed per a unit time is measured and is stored in the ROM of the ECU 30 in the form of a numerical value table using the engine fuel injection amount GI and the rotational speed NE. At the step 1105, the absorbed amount ANOX of NOx is calculated based on the fuel injection amount GI and the rotational speed NE read at the step 1101.

Then, at a step 1107, it is judged whether the output VOS of the air-fuel ratio sensor 31 on the downstream side of the SCs 5a and 5b now corresponds to a rich air-fuel ratio or not. When the VOS does not correspond to the lean air-fuel ratio at step 1107, it can be judged that the air-fuel ratio of the exhaust gas flowing into the NOx occluding and reducing catalyst 7 on the downstream side of the SCs 5a and 5b has not yet been changed over to the lean side despite the air-fuel ratio of the exhaust gas having changed over to the lean side on the upstream side of the SCs 5a and 5b due to the fact that the SCs 5a and 5b are still absorbing oxygen in the exhaust gas after the air-fuel ratio is changed from the rich side over to the lean side. In this case, the air-fuel ratio of the exhaust gas flowing into the NOx occluding and reducing catalyst 7 is near the stoichiometric air-fuel ratio despite the engine operating air-fuel ratio is lean, and no NOx is absorbed by the NOx occluding and reducing catalyst 7. Therefore, the routine directly proceeds to a step 1111 without executing the operation of a step 1109. On the other hand, when the VOS is corresponding to a lean air-fuel ratio at the step 1107, the SCs 5a and 5b are already saturated with oxygen, meaning that the absorption of oxygen is finished and the exhaust gas of a lean air-fuel ratio are flowing into the NOx occluding and reducing catalyst 7. In this case, NOx are actually absorbed by the NOx occluding and reducing catalyst 7, and the routine proceeds to the step 1109 where the absorbed amount ANOX of NOx calculated at the step 1105 is added to CNOX.

That is, at the steps 1107 and 1109, the value of the NOx counter is corrected by inhibiting the increase in the value of the NOx counter CNOX until oxygen is absorbed up to a maximum amount stored in the SCs 5a and 5b.

Next, at the step 1111, it is judged whether the value of CNOX calculated above has reached a predetermined upper-limit value $\alpha$, where $\alpha$ is a value calculated as $\alpha = CNOX_{MAX} \times K$. Here, $CNOX_{MAX}$ is a maximum amount of NOx occluded by the NOx occluding and reducing catalyst 7, and K is a positive constant (K<1, e.g., K≈0.7).

When CNOX≧$\alpha$ at the step 1111, NOx have been occluded in increased amounts by the NOx occluding and reducing catalyst 7. Therefore, NOx must be released from the NOx occluding and reducing catalyst 7. Hence, the value of a rich-spike execution flag XR is set to 1 at a step 1113, the value of CNOX is limited at steps 1115 and 1117 so that it will not exceed the maximum occluding amount of NOx $CNOX_{MAX}$ and then the operation ends. When the value of the rich-spike execution flag XR is set to 1, any one of the operations described with reference to FIGS. 2 to 5 is executed to thereby execute the rich-spike operation. At steps 1115 and 1117, the value of CNOX is restricted by $CNOX_{MAX}$. This is because, despite the flag XR being set to 1, the rich-spike operation may not often be executed depending upon the operating conditions of the engine, and the amount of NOx occluded by the NOx occluding and reducing catalyst 7 may often reach the maximum value. Upon imposing the above-mentioned limitation, the value of CNOX can be brought into agreement with the really occluded amount of NOx even under such circumstances.

On the other hand, when the VOM at the step 1103 corresponds to a rich air-fuel ratio, i.e., when the engine 1 is operating at a rich air-fuel ratio due to the rich-spike operation or due to a change in the operating conditions, the amount BNOX of NOx released from the NOx occluding and reducing catalyst 7 per a unit time is calculated at the step 1119. The released amount of NOx BNOX is measured in advance like the above-mentioned absorbed amount ANOX of NOx, and is stored in the ROM of the ECU 30 in the form of a numerical value table using the fuel injection amount GI and the rotational speed NE. At the step 1119, the released amount of NOx BNOX is calculated from the table based on NE and GI read at the step 1101.

Then, at a step 1121, it is judged whether the output of the air-fuel ratio sensor 31 on the downstream side is now rich, i.e., whether oxygen stored in the SCs 5a and 5b is all released or not after the air-fuel ratio has changed from lean to rich. When the output VOS is not rich at the step 1121, oxygen is still being released from the SCs 5a and 5b, and it can be judged that the exhaust gas flowing into the NOx occluding and reducing catalyst 7 is not still at a rich air-fuel ratio. In this case, NOx have not yet been released from the NOx occluding and reducing catalyst 7, and the routine proceeds to a step 1125 without executing the operation at a step 1123.

At the step 1121, when oxygen has all been released from the SCs 5a and 5b and the exhaust gas having a rich air-fuel ratio is flowing into the NOx occluding and reducing catalyst 7, the routine proceeds to the step 1123 where the value of the NOx counter CNOX is decreased by the released amount of NOx BNOX calculated at the step 1119. That is, at the steps 1121 and 1123, the value of the NOx counter CNOX is corrected by inhibiting the operation for decreasing the value of the NOx counter until oxygen stored in the SCs 5a and 5b is all released.

At a step 1123, it is judged whether the value of CNOX decreased as described above is becoming smaller than a predetermined value $\beta$ ($\beta \approx 0$) or not. When CNOX$\leq\beta$, it is considered that NOx have almost all been released from the NOx occluding and reducing catalyst 7 and have been purified by the reduction due to the rich-spike operation (or rich air-fuel ratio operation of the engine due to a change in the operating conditions). At a step 1127, therefore, the value of the rich-spike execution flag XR is set to 0. Then, at steps 1129 and 1131, the value of CNOX is so limited as will not become smaller than 0, and the operation ends. At the steps 1129 and 1131, the value of CNOX is so limited as will not become smaller than 0. This is because, when the operation at a rich air-fuel ratio continues depending upon the operating conditions of the engine, the exhaust gas having a rich air-fuel ratio continues to flow into the NOx occluding and reducing catalyst despite the value of the rich-spike execution flag XR is set to 0.

According to this embodiment, as described above, the value of the NOx counter CNOX is inhibited from being increased or decreased when oxygen is absorbed by, or is released from, the SCs 5a and 5b due to the $O_2$ storage capability, and the value of the NOx counter comes into agreement at all times with the amount of NOx really occluded by the NOx occluding and reducing catalyst 7. In this embodiment, the value of the NOx counter is inhibited from being increased or decreased when oxygen is absorbed by, or released from, the SCs 5a and 5b. In practice, however, NOx are absorbed by, or released from, the NOx occluding and reducing catalyst to some extent even when the air-fuel ratio of the exhaust gas flowing into the NOx occluding and reducing catalyst is close to the stoichiometric air-fuel ratio. Instead of inhibiting the value of the NOx counter from increasing or decreasing, therefore, the value of the NOx counter may be increased or decreased by only a small amount when oxygen is being absorbed by, or being released from, the SCs 5a and 5b.

At the step 1103, furthermore, whether the engine operating air-fuel ratio is lean or rich is judged based on the output VOM of the air-fuel ratio sensors on the upstream side of the SCs 5a and 5b. It is, however, also allowable to judge whether the engine operating air-fuel ratio is lean or rich based on the operating conditions of the engine (operation mode determined by the degree of accelerator opening ACCP and rotational speed NE) without using the output VOM of the air-fuel ratio sensors.

(5) Fifth Embodiment

Next, described below is the operation for estimating the occluded amount of NOx according to a fifth embodiment of the present invention. In the above-mentioned fourth embodiment, termination of the absorption or release of oxygen due to the $O_2$ storage capability of the SCs 5a and 5b is judged based on the output VOS of the air-fuel ratio sensor 31 on the downstream side of the SCs 5a and 5b. In this embodiment, however, the same judgement is rendered by using the amount of oxygen OSC stored in the SCs 5a and 5b without relying on the output VOS of the air-fuel ratio sensor on the downstream side.

As described earlier, the SCs 5a and 5b absorb and hold oxygen when the air-fuel ratio of the exhaust gas flowing in is lean, and release oxygen when the air-fuel ratio of the exhaust gas flowing in is rich. The amount of oxygen absorbed or released per a unit time is determined by the air-fuel ratio of the exhaust gas (more strictly, a difference between the air-fuel ratio of the exhaust gas and the stoichiometric air-fuel ratio) and by the flow rate of the exhaust gas. In this embodiment, therefore, the amount of oxygen AOSC absorbed by the SCs 5a and 5b per a unit time during the operation at a lean air-fuel ratio and the amount of oxygen BOSC released from the SCs 5a and 5b during the operation at a rich air-fuel ratio, are measured in advance by changing the operating conditions of the engine, and are stored in the ROM of the ECU 30 in the form of a numerical value table using the engine fuel injection amount GI and the rotational speed NE. Based on the same operation as the one for increasing or decreasing the value of the NOx counter, the ECU 30 calculates the absorbed amount of oxygen AOSC and the released amount of oxygen BOSC based on the engine operating conditions by using the numerical value table, and increases or decreases the stored amount of oxygen OSC to estimate the amount of oxygen stored in the SCs 5a and 5b. When the engine operating air-fuel ratio changes between the lean side and the rich side, the termination of absorption or release of oxygen by the SCs 5a and 5b is judged based on the stored amount of oxygen OSC.

Instead of the above-mentioned method of calculating the stored amount of oxygen, it is also allowable to calculate the stored amount of oxygen OSC by using the method of calculating the stored amount of oxygen (FIG. 6) in the above-mentioned third embodiment.

Figure 12:
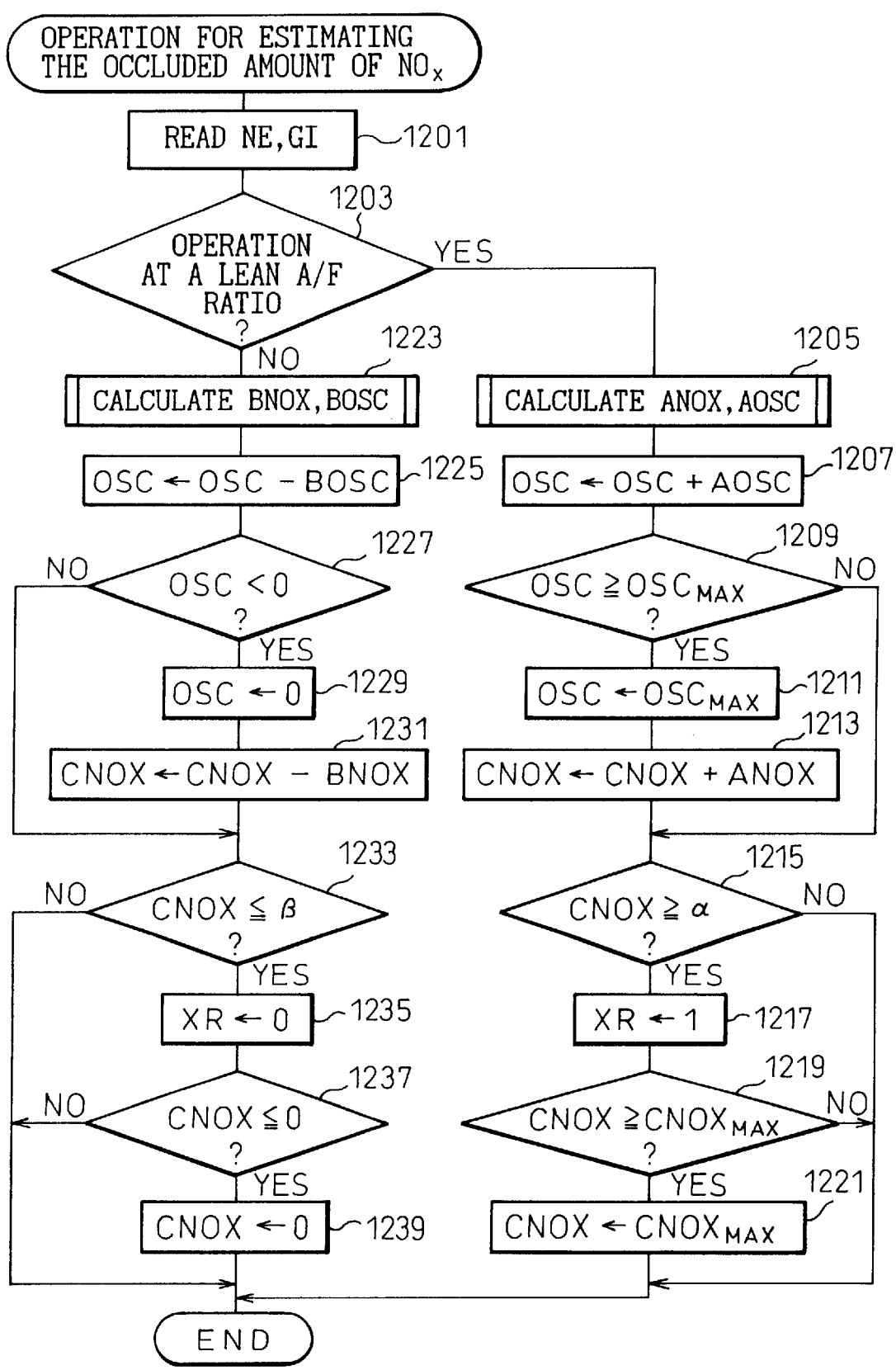
FIG. 12 is a flow chart illustrating the operation for estimating the amount of NOx occluded by the NOx occluding and reducing catalyst according to a fifth embodiment of the present invention.

FIG. 12 is a flow chart illustrating the operation for estimating the occluded amount of NOx according to this embodiment. This operation is conducted as a routine executed by the ECU 30 after every predetermined time interval. As the operation of FIG. 12 starts, the engine fuel injection amount GI and the engine rotational speed NE are read at a step 1201, and it is judged at a step 1203 whether the exhaust gas from the engine are now acquiring a lean air-fuel ratio or not, i.e., whether the engine 1 is now operating at a lean air-fuel ratio based on the output VOM of the air-fuel ratio sensors of the upstream side.

When the engine is operating at a lean air-fuel ratio at the step 1203, the amount of NOx ANOX absorbed by the NOx occluding and reducing catalyst 7 per a unit time and the amount of oxygen AOSC absorbed by the SCs 5a and 5b are calculated at a step 1205 based on the engine fuel injection amount GI and the rotational speed NE by using the numerical value tables stored in the ROM of the ECU 30. At a step 1207, the value of the stored amount of oxygen OSC is increased by the absorbed amount of oxygen AOSC. At a step 1209, it is judged whether the value of the stored amount of oxygen OSC thus increased has reached a maximum stored amount of oxygen $OSC_{MAX}$. When $OSC \geq OSC_{MAX}$, the SCs 5a and 5b are already absorbing oxygen up to the maximum stored amount of oxygen $OSC_{MAX}$ (saturation amount) after the engine operating air-fuel ratio has changed from the rich side to the lean side, and are no more capable of absorbing oxygen in the exhaust gas. At a step 1211, therefore, the value of OSC is set to a maximum value $OSC_{MAX}$. In this case, the absorption of oxygen by the SCs 5a and 5b has been terminated, and the exhaust gas flowing into the NOx occluding and reducing catalyst 7 on the downstream side of the SCs 5a and 5b are acquiring a lean air-fuel ratio. Since the NOx occluding and reducing catalyst 7 is absorbing NOx in the exhaust gas, the value of the NOx counter CNOX is increased by the absorbed amount of NOx ANOX calculated at the step 1205. When OSC<$OSC_{MAX}$ at the step 1209, on the other hand, the SCs 5a and 5b have not yet been saturated with oxygen and are still absorbing oxygen in the exhaust gas. Therefore, the exhaust gas flowing into the NOx occluding and reducing catalyst 7 is not still acquiring a lean air-fuel ratio. Therefore, the operation is not executed at the step 1213 and the value of the NOx counter CNOX is not increased.

Next, when the value of the NOx counter CNOX has reached a predetermined value, the rich-spike execution flag XR is set and the value of CNOX is limited to the maximum occluded amount of NOx $CNOX_{MAX}$ through the steps 1215 to 1221. The operations of the steps 1215 to 1221 are the same as the operations of the steps 1111 to 1117 of FIG. 11.

When the engine is operating at a rich air-fuel ratio at the step 1203, on the other hand, the amount of NOx BNOX released from the NOx occluding and reducing catalyst 7 per a unit time and the amount of oxygen BOSC released from the SCs 5a and 5b are calculated at a step 1223 based on the fuel injection amount GI and the rotational speed NE using the numerical value tables stored in the ROM of the ECU 30. At a step 1225, the stored amount of oxygen OSC is reduced by the released amount of oxygen BOSC. At a step 1227, it is judged whether oxygen stored in the SCs 5a and 5b is all released. When oxygen has all been released from the SCs 5a and 5b (OSC≦0), the exhaust gas flowing into the NOx occluding and reducing catalyst 7 is already acquiring a rich air-fuel ratio after the engine operating air-fuel ratio has been changed from the lean side over to the rich side, and the NOx occluding and reducing catalyst 7 is releasing NOx. At a step 1229, therefore, the value OSC is set to 0 and at a step 1231, the value of the NOx counter CNOX is decreased by the released amount of NOx BNOX. Then, through steps 1233 to 1239, the timing for ending the rich-spike operation is judged based on the value of CNOX and, as required, the value of CNOX is limited to 0. The operations of the steps 1233 to 1239 are the same as the operations of the steps 1125 to 1131 of FIG. 11.

According to this embodiment as described above, the estimated amount CNOX of NOx occluded by the NOx occluding and reducing catalyst 7 is corrected (steps 1209 to 1213, steps 1227 to 1231) based on the amount of oxygen stored in the SCs 5a and 5b when the engine operating air-fuel ratio is changed from the lean side to the rich side or from the rich side to the lean side. It is thus made possible to correctly estimate the amount of NOx occluded by the NOx occluding and reducing catalyst 7.

(6) Sixth Embodiment

Next, described below is a further embodiment of the present invention. In the fifth embodiment, a maximum value of OSC is limited to the maximum amount of oxygen (saturated amount of oxygen) $OSC_{MAX}$ stored in the SCs 5a and 5b at the time of calculating the amount of oxygen stored in the SCs 5a and 5b using the stored amount of oxygen OSC (steps 1209 and 1211 in FIG. 12). In the operation of FIG. 12, the stored amount of oxygen OSC may be calculated using the saturated amount of oxygen $OSC_{MAX}$ as a suitable predetermined value. More correctly, however, it is desired to correct $OSC_{MAX}$ depending upon the degree of deterioration of the catalyst as in the case of the above-mentioned third embodiment. In this embodiment, therefore, the value $OSC_{MAX}$ is corrected depending upon the degree of deterioration of the catalyst relying on the method described in the above-mentioned third embodiment in order to more correctly estimate the amount of oxygen stored in the SCs 5a and 5b. The method of detecting the degree of deterioration of the catalyst and the method of correcting $OSC_{MAX}$ depending on the degree of deterioration are the same as those described with reference to FIGS. 7 to 10, and are not described here in detail.

(7) Seventh Embodiment

Described below next is a seventh embodiment of the present invention. In the above-mentioned fourth embodiment, the value of the NOx counter CNOX is limited and will not to exceed a maximum occluded amount of NOx $CNOX_{MAX}$ when NOx are absorbed by the NOx occluding and reducing catalyst 7 (steps 1115 and 1117 in FIG. 11, steps 1219 and 1221 in FIG. 12). When the value of $CNOX_{MAX}$ greatly decreases due to the deterioration of the NOx occluding and reducing catalyst 7, therefore, the occluded amount of NOx may often not be correctly estimated. For example, when the maximum occluded amount of NOx $CNOX_{MAX}$ decreases down to $CNOX_{MAX}'$ ($CNOX_{MAX}$>$CNOX_{MAX}'$), the value of the NOx counter CNOX may often increase up to $CNOX_{MAX}$ beyond $CNOX_{MAX}'$ though the amount of NOx really occluded by the NOx occluding and reducing catalyst 7 is not increasing beyond $CNOX_{MAX}'$. In FIGS. 11 and 12, furthermore, the value a for judging the NOx counter for starting the rich-spike operation is given as $CNOX_{MAX} \times K$. However, when the timing for executing the rich-spike operation is judged assuming that $CNOX_{MAX}$ is constant though $CNOX_{MAX}$ is really decreasing, the amount of NOx occluded by the NOx occluding and reducing catalyst may increase to deteriorate the NOx-purifying efficiency. In this embodiment, therefore, this problem is solved by discriminating the deterioration of the NOx occluding and reducing catalyst 7 and by correcting the maximum occluded amount $CNOX_{MAX}$ of NOx depending on the degree of deterioration.

Described below is a method of discriminating the degree of deterioration of the NOx occluding and reducing catalyst 7. Various methods have been proposed for discriminating the deterioration of the NOx occluding and reducing catalyst 7. Described below is a method of discriminating the deterioration due to SOx contamination caused by the sulfur contained in the fuel.

The fuel of an engine contains trace amounts of sulfur which burn together with the fuel to form SOx. When SOx exists in the exhaust gas of a lean air-fuel ratio, the NOx occluding and reducing catalyst 7 absorbs SOx based on the same mechanism as that of absorbing NOx and holds SOx therein in the form of sulfates. Here, sulfates held by the NOx occluding and reducing catalyst are more stable than nitrates and are not easily released from the NOx occluding and reducing catalyst under the temperature conditions in which NOx are released from the NOx occluding and reducing catalyst. Therefore, the NOx occluding and reducing catalyst gradually accumulates sulfates, and the maximum amount $CNOX_{MAX}$ of NOx occluded by the NOx occluding and reducing catalyst decreases by an amount by which the sulfates are accumulated. In this embodiment, therefore, the maximum occluded amount $CNOX_{MAX}$ of NOx is corrected depending upon the amount of SOx occluded by the NOx occluding and reducing amount.

As mentioned above, the SOx contamination occurs as the NOx occluding and reducing catalyst 7 absorbs SOx emitted from the engine. The amount of SOx emitted by the engine varies in proportion to the amount of fuel fed to the engine per a unit time. Hence, the amount ASOX of SOx absorbed by the NOx occluding and reducing catalyst 7 per a unit time is expressed as ASOX =GI×NE×L, where GI is the amount of fuel injected into the engine, NE is the rotational speed, and L is a coefficient proportional to the SOx concentration in the fuel. That is, the absorbed amount ASOX of SOx varies in proportion to the amount of sulfur components in the fuel burning per a unit time. In this embodiment, the amount ASOX of SOx absorbed by the NOx occluding and reducing catalyst 7 per a unit time is calculated from the above-mentioned formula based on the engine fuel injection amount GI and the rotational speed NE while the engine 1 is operating at a lean air-fuel ratio by using an SOx counter CSOX similar to the NOx counter CNOX, in order to increase the value of the SOx counter CSOX.

As described above, furthermore, SOx absorbed by the NOx occluding and reducing catalyst 7 is released from the NOx occluding and reducing catalyst as the exhaust gas temperature $T_{EX}$ becomes higher than an appropriate temperature $T_D$ (temperature higher than an exhaust gas temperature during the normal rich-spike operation) while the engine is operating at a rich air-fuel ratio. Here, the amount BSOX of SOx released from the NOx occluding and reducing catalyst 7 per a unit time is a function of the air-fuel ratio of the exhaust gas and the temperature thereof. In this embodiment, the released amount BSOX of SOx is measured in advance by operating the engine 1 at a rich air-fuel ratio while varying the operating conditions of the engine, and is stored in the ROM of the ECU 30 in the form of a numerical value table using the engine fuel injection amount GI, rotational speed NE and exhaust gas temperature $T_{EX}$. When the engine is operated at a rich air-fuel ratio and the exhaust gas temperature exceeds $T_D$, the released amount BNOX of SOx is calculated by using the engine fuel injection amount GI, rotational speed NE and exhaust gas temperature $T_{EX}$ to calculate the released amount BSOX of SOx and to decrease the value of the SOx counter CSOX by BSOX per a unit time. Accordingly, the value of the SOx counter CSOX correctly represents the amount of SOx absorbed by the NOx occluding and reducing catalyst 7. Furthermore, since the maximum amount $CNOX_{MAX}$ of NOx held by the NOx occluding and reducing catalyst 7 decreases by an amount of Sox held by the catalyst 7, the value of $CNOX_{MAX}$ can be expressed as $CNOX_{MAX}=CNOX_{MAX0}-CSOX$, where $CNOX_{MAX0}$ is a maximum amount of NOx occluded by a new NOx occluding and reducing catalyst 7 that is not absorbing SOx at all.

Figure 13:
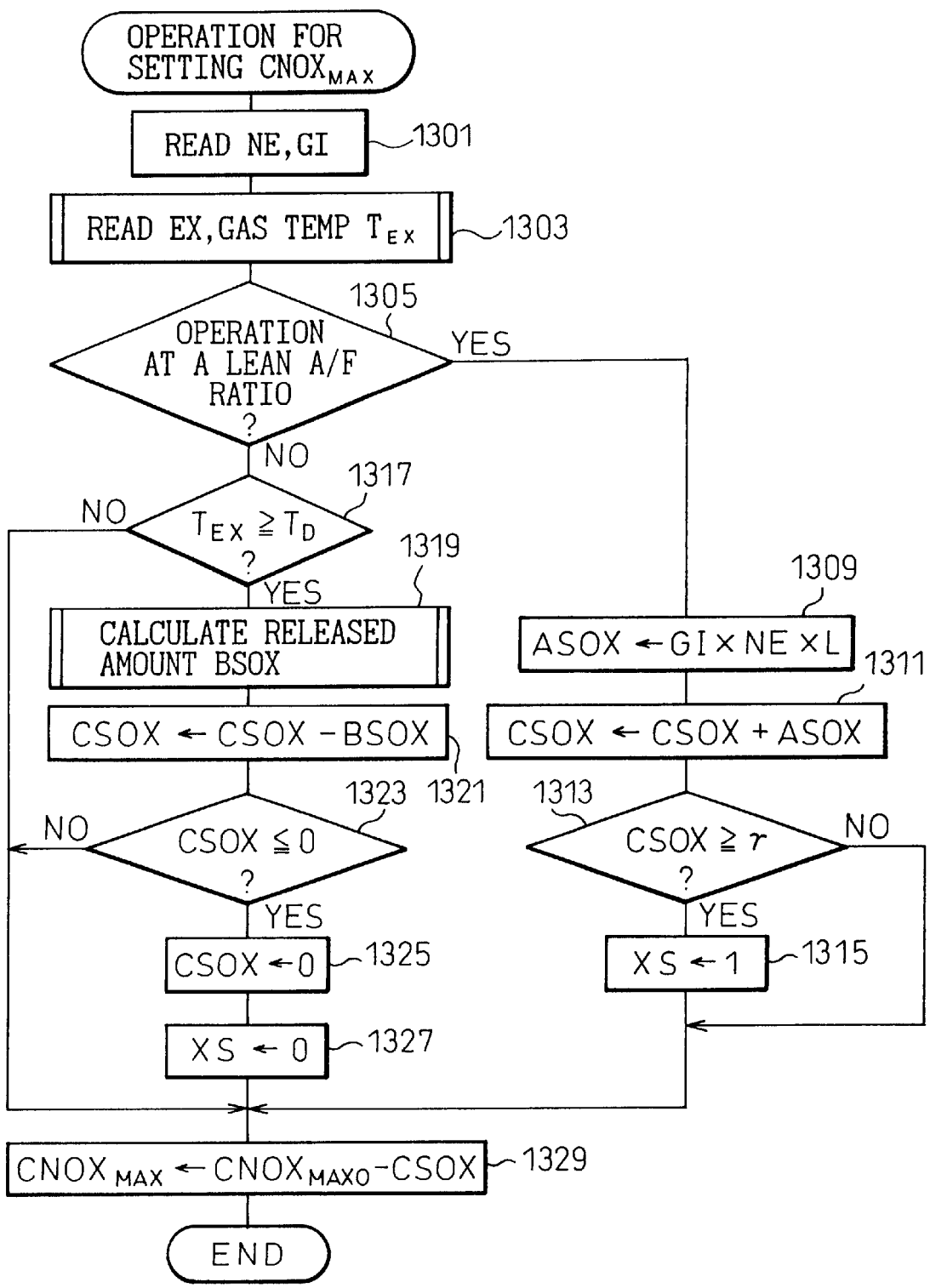
FIG. 13 is a flow chart illustrating the operation for setting a maximum amount of NOx occluded by the NOx occluding and reducing catalyst by taking the deterioration of the NOx occluding and reducing catalyst into consideration according to a seventh embodiment of the present invention.

FIG. 13 is a flow chart illustrating the operation for setting a maximum occluded amount of NOx $CNOX_{MAX}$ based on the absorbed amount of SOx described above. This operation is conducted by the ECU 30 at a predetermined interval.

When the operation of FIG. 13 starts, the engine fuel injection amount GI and the rotational speed NE are read at a step 1301, and the engine exhaust gas temperature $T_{EX}$ is read at a step 1303. The exhaust gas temperature $T_{EX}$ may be directly detected by using an exhaust gas temperature sensor disposed in the exhaust gas passage. In this embodiment, however, a relationship between the operating conditions (degree of accelerator opening, engine rotational speed, amount of the air taken in, intake air pressure, air-fuel ratio, amount of fuel fed, etc.) and the exhaust gas temperature of an actual engine has been measured in advance, and the exhaust gas temperature is calculated based on the operating conditions of the engine based on that relationship.

Then, it is judged at a step 1305 whether the engine operating air-fuel ratio is lean based on the output VOM of the air-fuel ratio sensors on the upstream side. When the engine is now operating at a lean air-fuel ratio, the routine proceeds to a step 1309.

At the step 1309, the amount ASOX of SOx absorbed by the NOx occluding and reducing catalyst per a unit time is calculated as ASOX=GI×NE×L. Then, at a step 1311, the value of the SOx counter CSOX is increased by the absorbed amount ASOX of SOx.

The operation at a step 1313 is for judging the timing for executing the SOx contamination-recovery operation. In this embodiment, when the amount CSOX of SOx occluded by the NOx occluding and reducing catalyst reaches a predetermined value γ, the operation of the engine is changed to the rich air-fuel ratio operation so that the exhaust gas temperature exceeds $T_D$ and that SOx are released from the NOx occluding and reducing catalyst. That is, when CSOX≧γ at the step 1313, the value of the SOx contamination-recovery operation execution flag XS is set to 1 at a step 1315. As the value of the flag XS is set to 1, the engine is operated at a rich air-fuel ratio which causes the exhaust gas temperature to exceed $T_D$ relying on a separate operation (not shown) executed by the ECU 30.

When the engine is operating at a rich air-fuel ratio at the step 1305, on the other hand, the routine proceeds to a step 1317 where it is judged whether the exhaust gas temperature $T_{EX}$ read at the step 1303 is higher than the SOx-releasing temperature $T_D$. When $T_{EX}<T_D$, since the air-fuel ratio is rich, SOx is not absorbed by the NOx occluding and reducing catalyst, yet no SOx is released from the NOx occluding and reducing catalyst since the temperature is low. When $T_{EX}<T_D$ at the step 1317, therefore, the routine proceeds to a step 1329 that will be described below without changing the value of the SOx counter CSOX.

When $T_{EX}≧T_D$ at the step 1317, then, the amount SOx of BSOX released from the NOx occluding and reducing catalyst 7 per a unit time is calculated from the numerical value table stored in the ROM of the ECU 30 based on the engine fuel injection amount GI, rotational speed NE and exhaust gas temperature $T_{EX}$. At a step 1321, the value of the SOx counter CSOX is decreased by BSOX. In this case, through the steps 1323 to 1327, the value of CSOX is so limited as will not assume a negative value (step 1325). When CSOX becomes 0, SOx have all been released from the NOx occluding and reducing catalyst 7. Therefore, the value of the SOx contamination-recovery operation execution flag XS is reset to 0 at the step 1327. Thus, the SOx contamination-recovery operation ends.

After the value of the SOx counter CSOX is set as described above, a maximum amount of NOx $CNOX_{MAX}$ occluded by the NOx occluding and reducing catalyst 7 is calculated at a step 1329 as $CNOX_{MAX}=CNOX_{MAX0}-CSOX$ by using a maximum occluded amount of NOx $CNOX_{MAX0}$ when the catalyst 7 is new.

In this embodiment, a maximum amount of NOx $CNOX_{MAX}$ occluded by the NOx occluding and reducing catalyst is set by taking the deterioration of the NOx occluding and reducing catalyst 7 into consideration, and the operation for setting the NOx counter of the above-mentioned third to fifth embodiments is executed by using $CNOX_{MAX}$. Accordingly, the value of the NOx counter CNOX correctly represents the amount of NOx occluded by the NOx occluding and reducing catalyst.

In this embodiment, deterioration of the NOx occluding and reducing catalyst is discriminated by using the amount of sulfur components in the fuel. However, the method of discriminating the deterioration of the NOx occluding and reducing catalyst is not limited thereto only, and any other method can be employed provided it is capable of correctly calculating a decrease in the maximum occluded amount of NOx caused by deterioration.

What is claimed is:

1. An exhaust gas purification device for an internal combustion engine which operates at a lean operating air-fuel ratio and a stoichiometric operating air-fuel ratio or a rich operating air-fuel ratio as required, comprising:

an exhaust gas purifying catalyst disposed in an exhaust gas passage of the engine and having an $O_2$ storage capability; and a storage decreasing means for decreasing the amount of oxygen stored in said exhaust gas purifying catalyst by feeding the fuel that does not contribute to the combustion to the engine so that the air-fuel ratio of the exhaust gas flowing into said exhaust gas purifying catalyst is more enriched than the engine operating air-fuel ratio when the engine operating air-fuel ratio is to be changed from a lean air-fuel ratio to the stoichiometric air-fuel ratio or a rich air-fuel ratio.

2. The exhaust gas purification device for an internal combustion engine according to claim 1, wherein an NOx occluding and reducing catalyst is provided in an exhaust gas passage downstream side of said exhaust gas purifying catalyst to absorb NOx in the exhaust gas when the air-fuel ratio of the exhaust gas flowing in is a lean air-fuel ratio and to release the absorbed NOx when the oxygen concentration in the exhaust gas flowing in has decreased, and said storage decreasing means decreases the amount of oxygen stored in said exhaust gas purifying catalyst when the absorbed NOx is to be released from said NOx occluding and reducing catalyst.

3. The exhaust gas purification device for an internal combustion engine according to claim 2, wherein provision is made of a means which executes a rich-spike operation for changing the engine operating air-fuel ratio into a rich air-fuel ratio for a short period of time when NOx absorbed by said NOx occluding and reducing catalyst is to be released therefrom while said engine is operating at a lean air-fuel ratio, and the amount of oxygen stored in said exhaust gas purifying catalyst is decreased by said storage decreasing means when the rich-spike operation is to be executed.

4. The exhaust gas purification device for an internal combustion engine according to claim 3, wherein said storage decreasing means includes a storage estimating means for estimating the amount of oxygen stored in said exhaust gas purifying catalyst based on the operating conditions of said engine, and executes the operation for decreasing the amount of oxygen depending upon the estimated stored amount of oxygen.

5. The exhaust gas purification device for an internal combustion engine according to claim 4, wherein said storage estimating means estimates the amount of oxygen stored in said exhaust gas purifying catalyst based on the deteriorated state of said exhaust gas purifying catalyst in addition to the operating conditions of said engine.

6. The exhaust gas purification device for an internal combustion engine according to claim 2, wherein said storage decreasing means includes a storage estimating means for estimating the amount of oxygen stored in said exhaust gas purifying catalyst based on the operating conditions of said engine, and executes the operation for decreasing the amount of oxygen depending upon the estimated stored amount of oxygen.

7. The exhaust gas purification device for an internal combustion engine according to claim 6, wherein said storage estimating means estimates the amount of oxygen stored in said exhaust gas purifying catalyst based on the deteriorated state of said exhaust gas purifying catalyst in addition to the operating conditions of said engine.

8. The exhaust gas purification device for an internal combustion engine according to claim 1, wherein said storage decreasing means includes a storage estimating means for estimating the amount of oxygen stored in said exhaust gas purifying catalyst based on the operating conditions of said engine, and executes the operation for decreasing the amount of oxygen depending upon the estimated stored amount of oxygen.

9. The exhaust gas purification device for an internal combustion engine according to claim 8, wherein said storage estimating means estimates the amount of oxygen stored in said exhaust gas purifying catalyst based on the deteriorated state of said exhaust gas purifying catalyst in addition to the operating conditions of said engine.

10. An exhaust gas purification device for an internal combustion engine which operates at a lean air-fuel ratio as required, comprising:

an exhaust gas purifying catalyst disposed in an exhaust gas passage of the engine and having an $O_2$ storage capability;

an NOx occluding and reducing catalyst disposed in said exhaust gas passage on the downstream side of said exhaust gas purifying catalyst to absorb NOx in the exhaust gas when the air-fuel ratio of the exhaust gas flowing in is a lean air-fuel ratio and to release the absorbed NOx when the oxygen concentration in the exhaust gas flowing in has decreased;

means for executing a rich-spike operation for changing the engine operating air-fuel ratio into a rich air-fuel ratio for a short period of time when the absorbed NOx are to be released from said NOx occluding and reducing catalyst while the engine is operating at a lean air-fuel ratio; and a storage decreasing means for decreasing the amount of oxygen stored in said exhaust gas purifying catalyst by further enriching the air-fuel ratio of the exhaust gas flowing into said exhaust gas purifying catalyst beyond the air-fuel ratio of the exhaust gas during said rich-spike operation for a predetermined period of time immediately after the start of said rich-spike operation.

11. The exhaust gas purification device for an internal combustion engine according to claim 10, wherein said storage decreasing means includes a storage estimating means for estimating the amount of oxygen stored in said exhaust gas purifying catalyst based on the operating conditions of said engine, and executes the operation for decreasing the amount of oxygen depending upon the estimated stored amount of oxygen.

12. The exhaust gas purification device for an internal combustion engine according to claim 11, wherein said storage estimating means estimates the amount of oxygen stored in said exhaust gas purifying catalyst based on the deteriorated state of said exhaust gas purifying catalyst in addition to the operating conditions of said engine.

13. An exhaust gas purification device for an internal combustion engine which operates at a lean air-fuel ratio and at the stoichiometric air-fuel ratio or a rich air-fuel ratio as required, comprising:

an exhaust gas purifying catalyst disposed in an exhaust gas passage of the engine and having an $O_2$ storage capability;

a NOx occluding and reducing catalyst disposed in said exhaust gas passage on the downstream side of said exhaust gas purifying catalyst to absorb NOx in the exhaust gas when the air-fuel ratio of the exhaust gas flowing in is lean and to release the absorbed NOx when the oxygen concentration in the exhaust gas flowing in has decreased;

a NOx occlusion amount-estimating means for estimating the amount of NOx occluded by said NOx occluding and reducing catalyst based on the operating conditions of the engine; and a NOx occlusion amount correction means for correcting the occluded amount of NOx estimated by said NOx occlusion amount-estimating means based on the amount of oxygen stored in said exhaust gas purifying catalyst when said engine operating air-fuel ratio has changed.

14. The exhaust gas purification device for an internal combustion engine according to claim 13, wherein said NOx occlusion amount-estimating means calculates the amount of NOx emitted from the engine and absorbed by the NOx occluding and reducing catalyst and the amount of NOx released from said NOx occluding and reducing catalyst based on the operating conditions of the engine, increases the estimated amount of NOx occluded by said NOx occluding and reducing catalyst by said absorbed amount of NOx when the engine operating air-fuel ratio is lean, and decreases said estimated occluded amount of NOx by said released amount of NOx when the engine operating air-fuel ratio is rich, thereby to estimate the amount of NOx occluded by said NOx occluding and reducing catalyst.

15. The exhaust gas purification device for an internal combustion engine according to claim 14, wherein, when the engine operating air-fuel ratio has changed from a lean air-fuel ratio over to a rich air-fuel ratio, said correction means inhibits the operation for decreasing the estimated amount of NOx by said NOx occlusion amount-estimating means from when the engine operating air-fuel ratio has changed to a rich air-fuel ratio until when oxygen stored in said exhaust gas purifying catalyst is all released from said exhaust gas purifying catalyst.

16. The exhaust gas purification device for an internal combustion engine according to claim 14, wherein, when the engine operating air-fuel ratio has changed from a rich air-fuel ratio to a lean air-fuel ratio, said correction means inhibits the operation for decreasing the estimated amount of NOx by said NOx occlusion amount-estimating means from when the engine operating air-fuel ratio has changed to a lean air-fuel ratio until when oxygen is stored in said exhaust gas purifying catalyst up to its maximum storing amount.

17. The exhaust gas purification device for an internal combustion engine according to claim 14, wherein said occluded NOx amount-estimating means includes a judging means for judging the degree of deterioration of said NOx occluding and reducing catalyst, and estimates the occluded amount of NOx based on the operating conditions of the engine and the degree of deterioration of said NOx occluding and reducing catalyst.

18. The exhaust gas purification device for an internal combustion engine according to claim 13, wherein said correction means includes a stored oxygen amount-estimating means for estimating the amount of oxygen stored in said exhaust gas purifying catalyst based on the air-fuel ratio of the exhaust gas flowing into said exhaust gas purifying catalyst.

19. The exhaust gas purification device for an internal combustion engine according to claim 13, wherein said correction means includes a stored oxygen amount-estimating means for estimating the amount of oxygen stored in said exhaust gas purifying catalyst based on the air-fuel ratio of the exhaust gas that have passed through said exhaust gas purifying catalyst when the engine operating air-fuel ratio has changed.

20. The exhaust gas purification device for an internal combustion engine according to claim 19, wherein said stored oxygen amount-estimating means includes a stored oxygen amount correction means for correcting the estimated stored amount of oxygen based on the degree of deterioration of said exhaust gas purifying catalyst.

21. The exhaust gas purification device for an internal combustion engine according to claim 13, wherein said occluded NOx amount-estimating means includes a judging means for judging the degree of deterioration of said NOx occluding and reducing catalyst, and estimates the occluded amount of NOx based on the operating conditions of the engine and the degree of deterioration of said NOx occluding and reducing catalyst.

* * * * *